United States Patent
Haque et al.

(10) Patent No.: US 10,280,025 B2
(45) Date of Patent: May 7, 2019

(54) SENSOR CONTROLLER FOR INTERPRETING NATURAL INTERACTION SENSOR FOR WEB HANDLING

(71) Applicant: Fife Corporation, Oklahoma City, OK (US)

(72) Inventors: Md M. Haque, Edmond, OK (US); Darcy J. Winter, Oklahoma City, OK (US); Wolfram Ploetz, Camas, WA (US); Darren S. Irons, Edmond, OK (US); Francesco Cristante, Hofheim am Taunus (DE); Gregory M. Jehlik, Edmond, OK (US)

(73) Assignee: Maxcess Americas, Inc., Oklahoma City, OK (US)

( * ) Notice: Subject to any disclaimer, the term of this patent is extended or adjusted under 35 U.S.C. 154(b) by 249 days.

(21) Appl. No.: 15/178,246

(22) Filed: Jun. 9, 2016

(65) Prior Publication Data

US 2016/0280492 A1    Sep. 29, 2016

Related U.S. Application Data

(62) Division of application No. 13/754,682, filed on Jan. 30, 2013, now Pat. No. 9,415,963.

(51) Int. Cl.
*G01L 5/04* (2006.01)
*B65H 23/02* (2006.01)
(Continued)

(52) U.S. Cl.
CPC ....... *B65H 23/0204* (2013.01); *B65H 23/038* (2013.01); *G01B 21/16* (2013.01); *B65H 2511/20* (2013.01)

(58) Field of Classification Search
CPC .............. B65H 23/0204; B65H 23/038; B65H 2511/20; G01B 21/16
(Continued)

(56) References Cited

U.S. PATENT DOCUMENTS 3,341,888 A * 9/1967 Bridge et al. ........... B29C 47/92
                                                264/40.3
3,342,284 A * 9/1967 Baird ................. B65H 23/0204
                                                226/45
(Continued)

FOREIGN PATENT DOCUMENTS

DE      103 52 274 A1    6/2004
EP      1 859 227       11/2007
WO      WO 94/16290 A1   7/1994

OTHER PUBLICATIONS

EP 14153125.1 European Search Report dated Jul. 21, 2015, 7 pages total.
(Continued)

*Primary Examiner* — Harshad R Patel
(74) *Attorney, Agent, or Firm* — Dunlap Codding, P.C.

(57) ABSTRACT

A sensor controller for web handling applications is described. The sensor controller is provided with a first port, a second port, a computer readable medium, and a processor. The first port receives a sequence of data frames capturing an area of a material web having a width to height ratio between 0.10 and 100. The computer readable medium stores logic indicative of identifying properties of a first group of data points of a feature of the material web extending in a web direction of travel. The processor scans the sequence of data frames to locate a transition between a property of the first group of data points and a property of a second group of data points in the data frames and generates a series of location signals indicative of lateral
(Continued)

locations of the transition within the data frames. The second port outputs the location signals.

22 Claims, 12 Drawing Sheets

(51) Int. Cl.
*G01B 21/16* (2006.01)
*B65H 23/038* (2006.01)

(58) Field of Classification Search
USPC .............................................. 73/159; 28/185
See application file for complete search history.

(56) References Cited

U.S. PATENT DOCUMENTS

| | | | |
|---|---|---|---|
| 3,570,624 A * | 3/1971 | O'Connor | B65H 23/0204 181/400 |
| 3,928,777 A | 12/1975 | Massa | |
| 4,329,838 A | 5/1982 | Zerle et al. | |
| 4,330,909 A | 5/1982 | Peschke et al. | |
| 4,366,406 A | 12/1982 | Smith et al. | |
| 4,523,122 A | 6/1985 | Tone et al. | |
| 4,532,167 A | 7/1985 | Mohr | |
| 4,606,486 A | 8/1986 | Brunner et al. | |
| 4,727,260 A | 2/1988 | Krauth | |
| 4,760,626 A | 8/1988 | Lonner et al. | |
| 4,780,631 A | 10/1988 | Groninger | |
| 4,848,632 A | 7/1989 | MacK et al. | |
| 4,920,622 A | 5/1990 | Mair et al. | |
| 5,021,674 A | 6/1991 | Brunner | |
| 5,072,414 A | 12/1991 | Buisker et al. | |
| 5,126,946 A * | 6/1992 | Ko | B65H 23/0204 226/15 |
| 5,133,511 A | 7/1992 | Mack et al. | |
| 5,166,532 A | 11/1992 | Brunner et al. | |
| 5,274,573 A * | 12/1993 | Buisker et al. | B65H 23/0204 226/45 |
| 5,307,973 A | 5/1994 | Schmidt et al. | |
| 5,322,990 A | 6/1994 | Brau et al. | |
| 5,377,891 A | 1/1995 | Peltzer et al. | |
| 5,421,500 A | 6/1995 | Niemann et al. | |
| 5,575,414 A | 11/1996 | Groninger et al. | |
| 5,619,779 A | 4/1997 | Geyer | |
| 5,652,388 A * | 7/1997 | Callan et al. | G01N 29/223 73/159 |
| 5,663,510 A | 9/1997 | Niemann et al. | |
| 5,803,334 A | 9/1998 | Patel et al. | |
| 5,834,877 A | 11/1998 | Buisker et al. | |
| 5,921,452 A | 7/1999 | Wulf et al. | |
| 6,289,729 B1 | 9/2001 | Haque et al. | |
| 6,323,948 B2 | 11/2001 | Haque et al. | |
| 6,348,696 B1 | 2/2002 | Alt et al. | |
| 6,450,381 B1 | 9/2002 | Ernst et al. | |
| 6,474,528 B2 | 11/2002 | Scharschinger et al. | |
| 6,550,656 B2 | 4/2003 | Kurz | |
| 6,566,670 B1 * | 5/2003 | Buisker et al. | B65H 23/0216 250/559.36 |
| 6,717,168 B2 | 4/2004 | Eisen et al. | |
| 6,757,064 B2 | 6/2004 | Eisen et al. | |
| 8,207,967 B1 | 6/2012 | El Dokor et al. | |
| 8,223,147 B1 | 7/2012 | El Dokor et al. | |
| 8,342,963 B2 | 1/2013 | Steiner et al. | |
| 8,696,458 B2 | 4/2014 | Foxlin et al. | |
| 8,702,507 B2 | 4/2014 | Lansdale et al. | |
| 8,803,978 B2 | 8/2014 | Wilson | |
| 2002/0152630 A1 * | 10/2002 | Lindsay et al. | D21F 5/004 34/111 |
| 2009/0206284 A1 | 8/2009 | Eisen | |
| 2010/0231897 A1 | 9/2010 | Hofeldt et al. | |
| 2011/0253425 A1 * | 10/2011 | Haase et al. | G03F 7/22 174/254 |

OTHER PUBLICATIONS

X-Box Kinect User manual, 2010, 19 pages total.
European Examination Report regarding European App. No. 14153125.1 dated Sep. 12, 2017, 5 pages total.

* cited by examiner

SENSOR CONTROLLER FOR INTERPRETING NATURAL INTERACTION SENSOR FOR WEB HANDLING

INCORPORATION BY REFERENCE

The present patent application claims priority to and is a divisional of the patent application identified by U.S. Ser. No. 13/754,682, filed Jan. 30, 2013, the entire contents of which are hereby incorporated herein by reference.

BACKGROUND

Pneumatic, photoelectric, and ultrasonic systems have been used for guiding material webs by edge detection or line detection. Photoelectric based systems, for example using optical sensors or infrared sensors, have been used to guide material webs based on features of the material web, such as an edge, an aspect of a material web at a given point on the material, or a printed graphic running longitudinally along the material web. Most sensors detect the web or its features by transmitting a signal and comparing a received signal through open atmosphere in relation to a received signal which has been passed through or interrupted by a web.

C shape sensors are common in web edge detection where the web passes through a gap in the C shape. Sensors are often housed in arms of the C extending at least partially across the web. The sensors may be divided between transmitter and receiver elements. The gap of the C shape sensors extend between the arms and may limit acceptable deviations in the web plane of the traveling web while passing through the C shape sensor. In order to overcome this limitation, C shape sensors may be mounted on or connected to an articulable element, known as a moving sensor guide that allows the C shape sensors to move in response to changes in the width of the material web. In addition, rollers may be employed, such as fixed support bars, close to the C shape sensors enabling better control over the web plane and enabling use of C shape sensors using smaller gaps. A plurality of C shape sensors have been used to guide a single material web, with sensors on either side of the material web, to simultaneously perform edge detection on opposing edges of the material web.

C shape sensors may be used in ultrasonic guiding systems, for example as described in U.S. Pat. No. 7,415,881. C shape sensors are also used in photoelectric systems as described in U.S. Pat. No. 4,291,825 that uses infrared sensing devices to perform web edge sensing to guide the material web.

Line sensors may be used which scan graphical patterns on the web, without performing edge detection, for guiding the material web. Line sensors may capture images and guide the material web based on a comparison of the images and the location of the graphical patterns with a stored set point. Line sensors may have a horizontal field of view that spans a portion or the entirety of the material web between opposing edges. However, the line sensors have a field of view in the web direction of travel that is limited to one pixel and encompasses no more than 5-7 microns of the web in the web direction of travel. Other sensors used in web guiding may include laser curtain sensors, ragged edge sensors, fiber optics sensors, raised feature sensors, capacitance or inductance sensors, and mechanical paddle or finger sensors.

Visual inspection systems for providing quality assurance to moving webs of material currently exist. One visual inspection system is sold under the trademark InPrint™ by Fife Corporation, the assignee of the present patent application. This visual inspection system provides quality assurance by allowing direct, live image viewing of a moving web. In particular, this visual inspection system captures images of a moving web at 10 images/second and compares the captured images to a reference image of the web to detect deviations of the captured image from the reference image. When deviations are detected, the visual inspection system sounds an alarm, and/or directs a particular product to an appropriate location to be manually inspected.

Web handling systems exist to control the tension in a web of material. The tension in the web is detected by a load cell bearing on the web of material, and the tension is controlled by a brake or clutch system that can vary the rate of movement of a roller for feeding and/or retrieving of the web of material.

Natural interaction sensors use depth sensors which respond to emitted radiation, such as infrared (IR) frequency wavelengths of light to measure distances between an object and the sensor. Further natural interaction sensors may also employ audio and optical sensors to combine image data, sound data, and distance data to provide three dimensional interactions between an object and a computer system. Commercially available natural interaction sensors are sold under a variety of trade names including KINECT™, LEAP™, and XTION PRO LIVE™. However, natural interaction sensors have not previously been used in web handling systems.

There is a need for a web handling system capable of guiding and/or tensioning material webs based on one or a combination of factors including a location of one web edge or multiple web edges, while enabling improved quality inspection of the web in an automated setting.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one version, the present disclosure describes a sensor controller having a first port, one or more non-transitory computer readable medium, and one or more processor. The first port is configured to receive a sequence of data frames captured at distinct instants of time. The data frames capture an area of a material web having a width to height ratio between 0.10 and 100. The data frames can be either image data frames or depth image frames, for example and may be generated by supplying a medium into a field of view and capturing reflections of the medium. The medium can be electromagnetic waves, such as light, and/or radio frequency signals. The one or more non-transitory computer readable medium stores logic indicative of information identifying properties of a first group of data points (e.g., pixels or the like) of the feature of the web. The one or more processor analyzes the sequence of data frames having the first group of data points depicting the feature of the web, and a second group of data points depicting a background transverse to the feature, the one or more processor scanning the sequence of data frames to locate a transition between a property of the first group of data points and one or more property of the second group of data points in the data frames and to generate a series of location signals indicative of a lateral location of the transition. The second port outputs the location signals.

In another version, the sensor controller has a first port, a second port, one or more non-transitory computer readable medium, and one or more processor. The first port is configured to receive a data stream, of image data and/or depth data of a web. The one or more non-transitory computer readable medium stores first logic indicative of information identifying a first group of data points of a first feature (e.g., a web edge or printed pattern) extending in a web direction of travel of the web, and second logic indicative of information identifying a second group of data points of a second feature (e.g, web edge or printed pattern) extending in a web direction of travel of the web. The one or more processor is configured to analyze the data stream, the data stream having a sequence of data frames (e.g., image data frames and/or depth data frames) with the first group of data points of the first feature, a third group of data points depicting a background transverse to the first feature, and the second group of data points depicting the second feature, the second feature spaced a distance laterally from the first feature, the data frames captured at distinct instants of time, the processor scanning the sequence of data frames to locate a first transition between the first group of data points and the third group of data points in the data frames, and a second transition between the second group of data points and the third group of data points in the data frames, and to generate a web handling signal indicative of at least one of the locations of the first and second transitions and a lateral distance between the first and second transitions.

Another embodiment of the disclosure describes a sensor controller having a first port, a second port, one or more non-transitory computer readable medium, and one or more processor. The first port is configured to receive a sequence of signals from a topographic sensor having a field of view encompassing a feature of a web, the sequence of signals including a series of depth maps. The one or more non-transitory computer readable medium stores web handling information indicative of a desired aspect of the feature of the web. The one or more processor is configured to determine a current aspect of the feature of the web using at least one of the depth maps in the series of depth maps and to determine an error signal indicative of a difference between the desired aspect and the web handling information stored on the one or more non-transitory computer readable medium. The second port outputs the error signal.

In another version, the sensor controller has a first port, one or more non-transitory computer readable medium, one or more processor, and a second port. The first port is configured to receive a sequence of signals from a topographic sensor having a field of view encompassing a feature of a web; the sequence of signals including a series of depth maps, the first port also being configured to receive a sequence of video frames of the feature of the web synchronized with the depth maps. The one or more non-transitory computer readable medium stores web handling information indicative of a desired location and desired quality inspection aspect of the feature of the web. The one or more processor is configured to determine a current location of the feature of the web using at least the sequence of video frames, and to determine a current quality inspection aspect of the feature of the web using at least one of the depth maps in the series of depth maps and to determine error signals indicative of a difference between the desired location and current locations, and desired and current quality inspection aspects. The second port outputs the error signals.

The present disclosure also describes a web handling system having a natural interaction sensor (or movement sensor) and a sensor controller. The natural interaction sensor supplies a medium to reflect off of a surface of the web, and receives reflections of the medium from the surface of the web, the natural interaction sensor developing a series of topographical maps indication of a location of at least one feature extending in a web direction of travel of the web. The sensor controller has a first port configured to receive the topographical maps from the natural interaction sensor, one or more processor configured to analyze the topographical maps received from the natural interaction sensor, by scanning the topographical maps to locate a transition in the topographical maps and to generate a series of location signals indicative of a lateral location of the transition.

A method is also presented for handling a material web. The method is performed by receiving a sequence of signals from a topographic sensor having a field of view encompassing a feature of a web, with the sequence of signals including a series of depth maps. Web handling information indicative of a desired aspect of the feature of the web is stored. A current aspect of the feature of the web is determined using at least one of the depth maps in the series of depth maps and to determine an error signal indicative of a difference between the desired aspect and the web handling information. The error signal is then output to a web controller.

In another aspect, a web handling system is described for guiding a web movable in a web direction through a travel path threaded around at least one steering roller of the web handling system. The web handling system also has a base, a platform, a natural interaction sensor, a sensor controller, a web controller, and a platform drive. The platform is mounted on the base to move through a guiding range. The platform may be any suitable type of assembly for steering the web, such as a steering guide or a displacement guide. The at least one steering roller is mounted on the platform and disposed transversely of a transversely to the web direction of travel when the web travels across the platform. The natural interaction sensor supplies a medium to reflect off of a surface of the web, and receives reflections of the medium from the surface of the web, the natural interaction sensor developing a series of topographical maps indication of a location of at least one feature extending in a web direction of travel of the web. The sensor controller has a first port configured to receive data from the natural interaction sensor, one or more processor configured to analyze the data received from the natural interaction sensor, which can be image data and/or depth data. The one or more processor scans the data to locate a transition in the topographical maps to generate a series of location signals indicative of a lateral location of the transition. The sensor controller also has a second port coupled to the one or more processor and outputting the location signals. The controller is configured to generate control signals responsive to the signals produced by the sensor controller and configured to automatically correct a deviation from a predetermined position of the web. The platform drive is configured to be responsive to the control signals generated by the controller for laterally moving the platform and thereby controlling an angular position of the platform relative to the base.

BRIEF DESCRIPTION OF DRAWINGS

Certain embodiments of the present inventive concepts will hereafter be described with reference to the accompanying drawings, wherein like reference numerals denote like elements, and.

DESCRIPTION OF EXEMPLARY EMBODIMENTS

Specific embodiments of the present disclosure will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Figure 1:
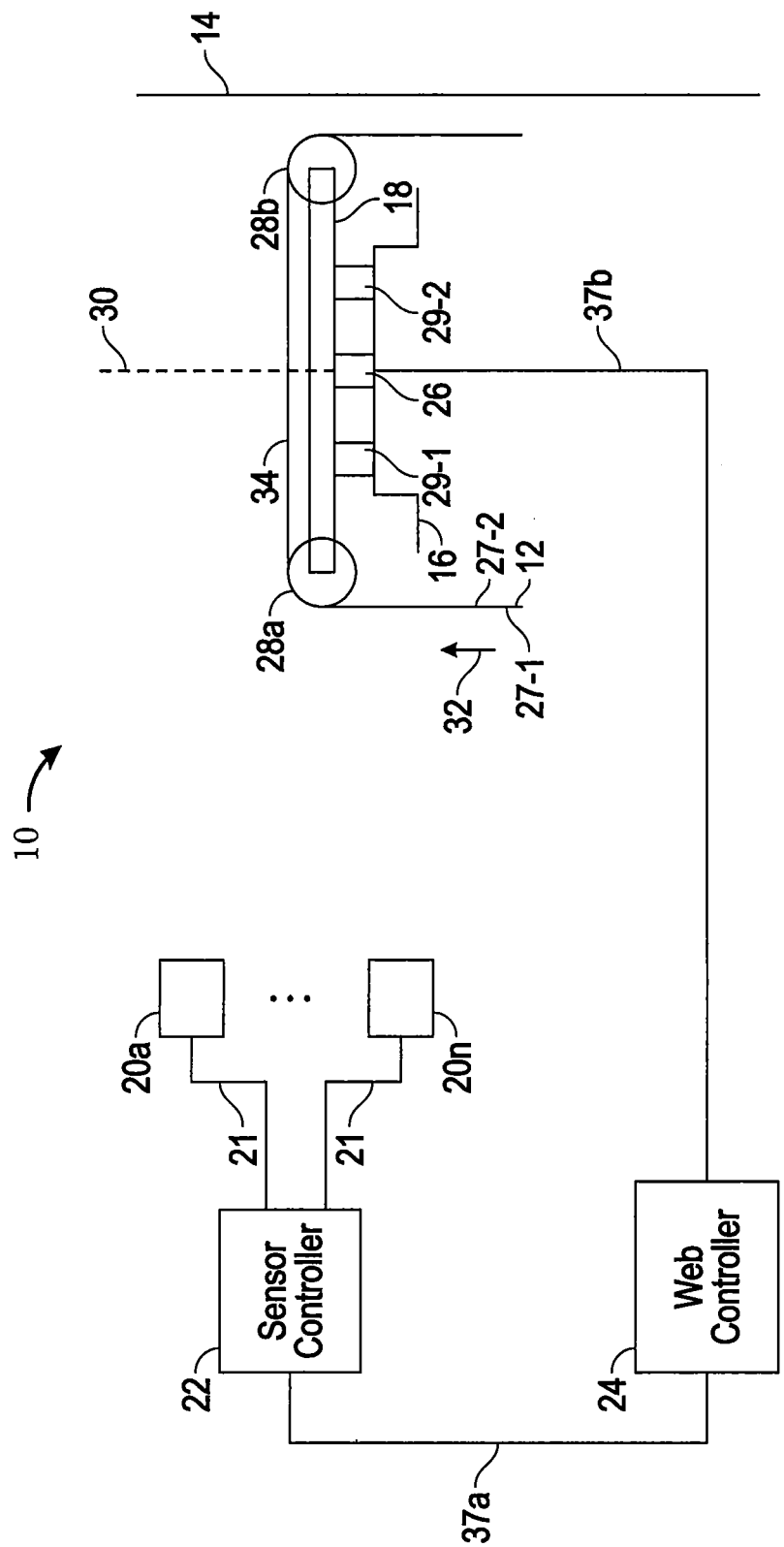
FIG. 1 is an embodiment of a web handling system in accordance with the present disclosure.

Referring now to the figures, shown in FIG. 1 is a web handling system 10 for handling a continuous material web 12 that is moving past a background 14. The web handling system 10 may be used in web guiding, tension control, and quality inspection industries, for example. The web handling system 10 is shown by way of example as a web guiding system. The web handling system 10 is capable of detecting one or multiple web edges, measuring web width, and detecting web defects, including quality inspection aspects. Detecting one or multiple edges and measuring web width provides the web handling system 10 with the ability to detect lateral changes in the location of the material web 12, as well as to monitor tension within the material web 12 based on changes in width of the material web 12. For example, for certain types of material including plastics and woven materials, decreases in the width of the material web 12 are indications of stretching caused by increased tension.

The web handling system 10 may guide the material web 12 with depth information using algorithms to interpret depth maps in a series of depth maps generated by one or more sensors. The sensors may generate color and depth information, and in some embodiments depth images generated from the depth information may have color information artificially generated to detail depth differences for display purposes. The depth maps may be created by supplying a medium to reflect off of a surface of the material web 12 and the background 14 and receiving reflections of the medium from the surface of the web. The medium may be light or radio frequency signals. For example, the depth image may be created by painting a field of view with infrared points of light from an emitter and observing the resulting reflected image with a depth sensor. For example, the depth maps and depth images may be created in a manner set forth in U.S. Pat. No. 8,050,461, the entire content of which is hereby incorporated by reference. The depth maps may also be created by sonar or radar techniques that interpret echoes reflected off of the surface of the material web 12 and the background 14.

The web handling system 10 may comprise a base 16 supporting a platform 18. The platform 18 is mounted on the base 16 and is configured to provide a range of movement to enable guiding of the material web 12. The web handling system 10 also includes a plurality of sensors 20 (two being shown and designated by the reference numerals 20a and 20n for purposes of clarity) to detect and analyze one or more characteristics and one or more position of the material web 12 and supply data signals via one or more communication links 21, a sensor controller 22 configured to receive data from the plurality of sensors 20 via the communication link(s) 21 and provide sensor control signals indicative of the characteristics and position of the material web 12, a web controller 24 which may also be referred to as a web controller 24 and may be configured to generate error signals responsive to the sensor control signals produced by the sensor controller 22, and a platform drive 26 configured to be responsive to the error signals generated by the web controller 24 to guide the material web 12. The plurality of sensors 20 may be components of a natural interaction sensor which may be photoelectric based, sonar based, non-photoelectric based or a combination thereof. The natural interaction sensor, as will be explained in more detail below, may have one or more high frame rate digital cameras, e.g., 30-290 frames per second, one or more topographical sensors, such as infrared depth sensors, one or more audio sensors, and combinations thereof. For example, the natural interaction sensor may use infrared light with an advanced CCD camera positioned behind a dark IR filter to sense an object as small as 0.01 mm and at max. frame rate of 290 frame/sec. The sensor controller 22, as will be explained in more detail below, may be comprised of a computer system, a signal converter, and one or more ports to connect to the plurality of sensors 20 such as the natural interaction sensor.

The web handling system 10 may at times guide the material web 12 relative to and in proximity to the background 14 which may be located transverse to the material web 12 and within the field of view of the sensors 20. Preferably, the material web 12 has a first side 27-1 and a second side 27-2. The sensors 20 may face the first side 27-1, and the background 14 may face the second side 27-2 as shown in FIG. 1. Thus, in this embodiment the web handling system 10 does not require sensors 20 to be located on the first side 27-1 and the second side 27-2.

The background 14 may be used to enable performance of tracking, quality inspection, and other functions. In one embodiment, the web handling system 10 may simultaneously guide a plurality of material webs 12 past the background 14. Although the web handling system 10 may guide a plurality of material webs 12, for the sake of clarity, the web handling system 10 will be described as guiding a single material web 12. However, it will be understood by one skilled in the art that the web handling system 10 may guide one or the plurality of material webs 12, as will be described below, without departing from the present disclosure. The plurality of material webs 12 may be positioned side-by-side, or overlap on top of each other so long as the sensors 20 can detect a transition between the plurality of material webs 12 and/or the plurality of material webs and the background 14. For example, two of the plurality of material webs 12 may overlap but be provided with different colors such that the sensors 20 can detect a transition in the overlapping part of the material webs 12.

The base 16 may be connected to the platform 18 via a suitable mechanism enabling the base 16 to support the platform 18 while allowing at least a portion of the platform 18 to move laterally to the web direction of travel in response to the control signals generated by the web controller 24. The base 16 may be created from metal, plastic, or any other suitable material capable of supporting the platform 18. The base 16 may also be connected to the platform drive 26 such that the platform drive 26 may be used to move the platform 18 in relation to the base 16 without moving the base 16. In other words, the base 16 is preferably stationary and the platform 18 is moveable with respect to the base 16.

The platform 18 may be connected to the base 16 to allow movement relative to the base 16 and is used to support at least one steering roller 28. The base 16, platform 18 and the at least one steering roller 28 can be implemented in a variety of manners such as a steering-type guide providing web position correction by bending the material web 12 through a long entering span. In another embodiment, the base 16, platform 18 and the at least one steering roller can be a displacement-type guide which may pivot to twist the material web 12 usually using more than one steering roller 28. As shown in FIG. 1, the platform 18 supports two steering rollers 28a and 28b by way of example on opposite ends thereof. However, it will be understood by one skilled in the art that the platform 18 may be used to support fewer or greater steering rollers 28 sufficient to direct the material web 12. The platform 18 may be pivotally connected to the base 16 via linear slides 29-1 and 29-2, or any other suitable mechanism, such that the platform 18 may articulate (e.g., pivot or move in an arc) about an axis 30 in a predetermined range such that articulating the platform 18 may change an angular position of the platform 18 relative to the base 16 and thereby cause a correction in a deviation of the material web 12 from a predetermined position as the material web 12 moves along a web direction of travel 32. The steering rollers 28a and 28b may be mounted to the platform 18 transversely to the web direction of travel 32 along a travel path 34 of the material web 12 through the web handling system 10.

Figure 2:
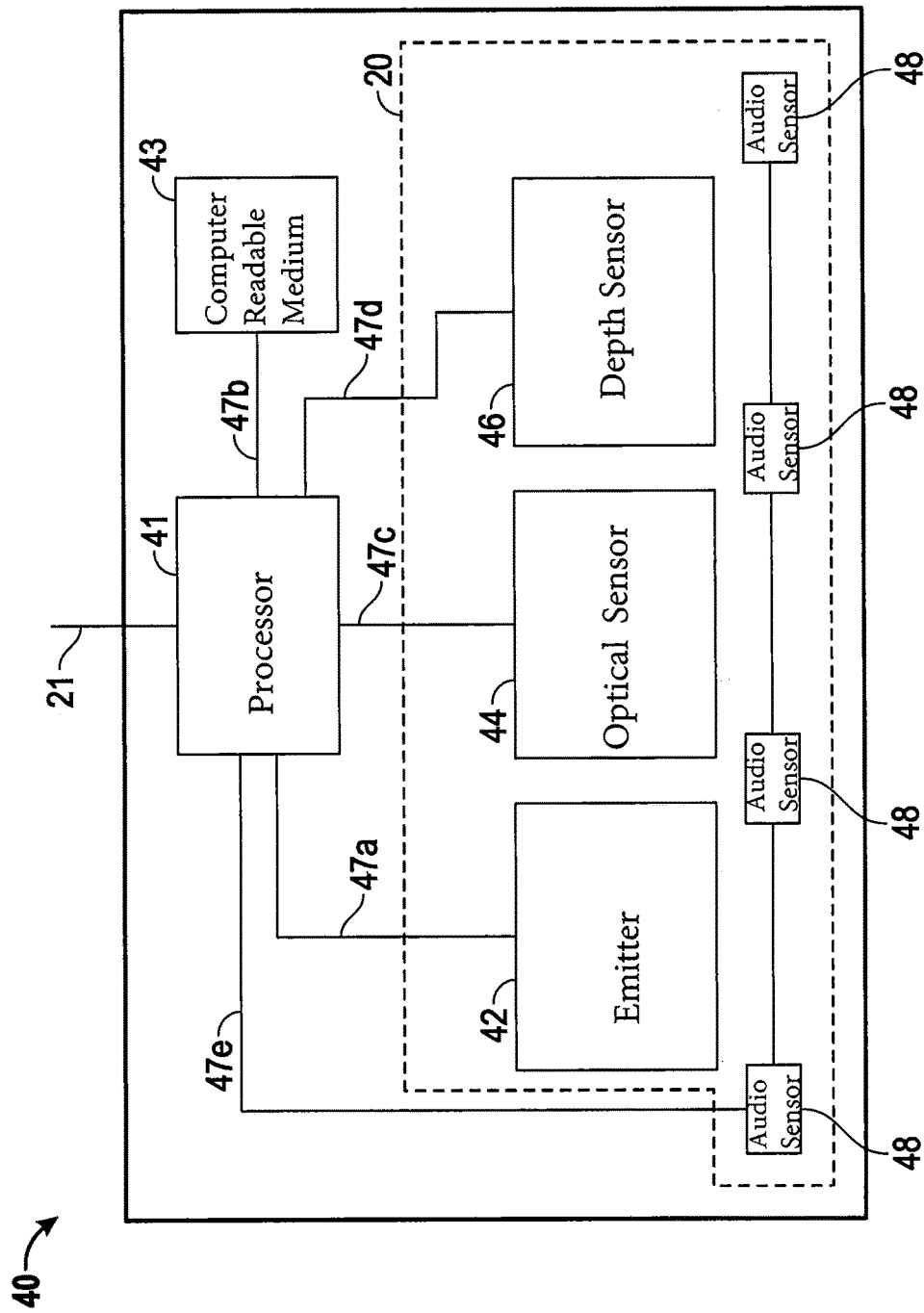
FIG. 2 is a block diagram of an embodiment of a natural interaction sensor according to the present disclosure.

The plurality of sensors 20 detect and analyze characteristics of the material web 12 such as one or multiple web edges, web plane changes, web width, web quality with respect to images stored in the sensor controller 22, and web defects, for example. As shown in FIG. 2, certain of the plurality of sensors 20 may be combined together in a housing to form a natural interaction sensor 40, which may be photoelectric based, sonar based, non-photoelectric based and combinations thereof. The sensors 20 may supply and/or detect a medium, such as light in a visible spectrum and/or an infrared spectrum. Further the sensors 20 may supply and/or detect one or more laser beams or radio frequency signals. The natural interaction sensor 40, as will be described below in more detail, may comprise the plurality of sensors 20, or certain of the plurality of sensors 20, and may be positioned to have a field of view extending from the natural interaction sensor 40 that encompasses a feature of the material web 12, a section of the material web 12, a portion of the material web 12 and a portion of the background 14, or combinations thereof. The field of view has a width to height ratio between 0.10 and 100, and may encompass an area of the material web 12 and/or the background 14 having a maximum width of 20 feet, and a maximum height of 15 feet, for example.

The plurality of sensors 20 may be implemented as audio sensors, topographic sensors, optical sensors, such as high frame rate digital cameras, or any other suitable sensors which may capture and provide information indicative of characteristics and positioning of the material web 12 relative to the background 14. For example, the topographical sensors may be implemented as infrared (IR) sensors capable of capturing information related to a distance between the plurality of sensors 20 and the material web 12 and/or the background 14. The topographical sensors may also be configured to determine distances between the material web 12 and the background 14 irrespective of the distance from the topographical sensor. An optical sensor, of the plurality of sensors 20, may be implemented as a digital still camera or digital video camera capable of capturing a plurality of images of the material web 12 and background 14, for example.

In one embodiment, the plurality of sensors 20, when implemented as the natural interaction sensor 40 may provide a sequence of synchronized depth images, color video images, and audio streams. The natural interaction sensor 40 may use parallel computational logic. The natural interaction sensor 40 may receive a light coding infrared pattern as input and produce a depth image of the material web 12 in a data matrix [I,J] where I and J are in a range from 1 to 60,000, and are desirably larger than 1. For example, I can be 640 and J can be 480. The data matrix [I,J] may have an aspect ratio, i.e., width to height ratio, between 0.10 and 100. However, in certain embodiments described in more detail herein, the aspect ratio is between about 1.3 and 1.7. The natural interaction sensor 40 may be implemented in a long range version, spaced away from the material web 12 between 0.8 to 3.5 m, or a short range version, spaced away from the material web 12 between 0.3 to 1.5 m. In general, the natural interaction sensor 40 may be spaced from the material web 12 any suitable distance such that the field of view of the natural interaction sensor 40 encompasses the features to be detected in the particular web handling application. Further, in one embodiment, the natural interaction sensor 40 may include an array of multiple sensors sensing information together with the combined information placed into a single data matrix such that the number of pixels within the single data matrix is more than the maximum pixel count of any individual sensor within the array.

The sensor controller 22, which will be explained in more detail below, may be configured to receive data from the plurality of sensors 20 and provide signals indicative of characteristics and position of the material web 12 relative to another material web, and/or the background 14. The sensor controller 22 may be electrically connected to the plurality of sensors 20 and the web controller 24 by wired connections, wireless connections, or any other suitable connections sufficient to receive information from the sensors 20 and transmit sensor control information, e.g., location signals, to the web controller 24. As shown in FIG. 1, the sensor controller 22 is connected to the web controller 24 via signal path 37a.

The web controller 24 may be electrically connected to the sensor controller 22 and the platform drive 26 via wired connections, such as signal paths 37a and 37b, respectively, or via wireless connections. For example, as shown in FIG. 1, the sensor control information sent by the sensor controller 22 via signal path 37a may be received and processed by the web controller 24. The web controller 24 may in turn transmit control signals to the platform drive 26 via signal path 37b causing the platform drive 26 to actuate and move the platform 18 based on the control signals sent from the web controller 24. In response to receiving the sensor control information, the web controller 24 may compare such signals to a predetermined guide point position and then send the control signals to the platform drive 26 for adjustment of the platform 18. The web controller 24 may be preprogrammed to process the sensor control signals to produce control signals that may be used to maintain the travel path 34 of the material web 12 in a same position on the steering rollers 28a and 28b, for example, by correcting the angular position of the platform 18 in response to any deviations of the travel path 34 of the material web 12 from the predetermined guide point position.

The platform drive 26 may be implemented as a motor, engine, one or more actuators, one or more servos, one or more hydraulics, or other mechanical or electrical mechanism capable of manipulating the platform 18. The platform drive 26 may be configured to receive control signals from the web controller 24 and control the angular position of the platform 18 relative to the base 16, based on the control signals of the web controller 24. The platform drive 26 may be electrically connected to the web controller 24 through wired or wireless connections, such that the platform drive 26 is capable of receiving control signals from the web controller 24, and may be mechanically connected to the platform 18 such that actuation of the platform drive 26 via the control signals may cause the platform 18 to move relative to the base 16.

Shown in FIG. 2 is an embodiment of the natural interaction sensor 40, which may comprise the plurality of sensors 20. The natural interaction sensor 40 may be provided with one or more processor 41, one or more emitter 42 for supplying wavelengths of light (which may be infrared light, or light outside of the infrared spectrum), one or more non-transitory computer readable medium 43, one or more optical sensor 44 for capturing a plurality of pixels used to detect features of the material web 12, and one or more depth sensor 46 for capturing depth data due to reflections of the wavelengths supplied by the emitter 42 to detect a depth of a feature of the material web 12 and/or the background 14. In one embodiment, the natural interaction sensor 40 may also be provided with one or more audio sensors 48, configured to provide a synchronization data stream for synchronizing the optical sensor 44 and the depth sensor 46. In yet another embodiment, the natural interaction sensor 40 may be photoelectric based, as described above, or may be sonar based. The natural interaction sensor 40 may also be provided with both photoelectric and sonar sensors used in combination. In certain embodiments, the natural interaction sensor 40 may be a commercially available device sold under a variety of trade names including KINECT™, LEAP™, and XTION PRO LIVE™

The one or more processor 41 may be implemented as a single processor 41 or multiple processors 41 working together or independently to process the plurality of pixels from the optical sensor 44 and/or the depth data from the depth sensor 46. Embodiments of the processor 41 may include an image processor, a digital signal processor (DSP), a central processing unit (CPU), a microprocessor, a multi-core processor, an application specific integrated circuit, a field programmable data array and combinations thereof. The processor 41 is coupled to, and configured to receive information from and transmit control signals to, the non-transitory computer readable medium 43, emitter 42, the optical sensor 44, and the depth sensor 46. The non-transitory computer readable medium 43 can be a single non-transitory computer readable medium, or multiple non-transitory computer readable medium functioning logically together or independently. The processor 41 may be capable of communicating with the Emitter 42, the non-transitory computer readable medium 43, the optical sensor 44, the depth sensor 46, and the audio sensor 48 via paths 47a, 47b, 47c, 47d, and 47e respectively. The paths 47a-47d may include multidrop topology, a daisy chain topology, or one or more switched hubs. The paths 47a-47d can also be a serial topology, a parallel topology, a proprietary topology, or combinations thereof.

In one embodiment, the emitter 42 may be configured to supply light in a wavelength range of between about 750 nm-1 mm, which is within the IR range of wavelengths.

However, it should be understood that the emitter 42 may be configured to supply light outside of the infrared spectrum of light. The depth sensor 46 is adapted to receive and interpret reflections of the light supplied by the emitter 42, and may be implemented as a depth camera for example, configured to receive a depth data stream (e.g., reflected light) indicative of a distance between the depth sensor 46 and a target, such as the material web 12 and/or the background 14. For example, the depth data stream data may be reflected IR light that was supplied by the emitter 42, and reflected by the material web 12 and the background 14. The depth sensor 46, receiving the depth data stream, may produce depth data frames in a matrix d[I,J], for example. The depth data frames d[I,J] may be used alone to detect the web edge by detecting a difference in depth between the depth sensor 46 and the material web 12 and the depth sensor 46 and the background 14. The depth data stream may be represented by characters having any suitable maximum number of bits, such as 16 bits 32 bits, 64 bits or the like. Further, it should be understood that the characters may encompass less bits than the maximum number of bits. For example, in one embodiment, the depth data stream is 16 bit data, while only carrying 12 bits of information. Each pixel of the depth data frame d[I,J] may represent the distance, in a unit of measurement, such as centimeters for example, from the depth sensor 46 to an object, which in this instance may be the material web 12 and/or the background 14. In one embodiment, the resolution of the depth sensor 46 may be 640×480 pixels and may produce the sequence of depth data frames at a rate of about 30 frames per second. However, it will be understood by one skilled in the art that the resolution and the frame rate of the depth sensor 46 may vary and use a greater resolution, lower resolution, greater frame rate or a lower frame rate. For example, the amount of data in the depth data frames, produced by the depth sensor 46, may be about 18 Mbytes per second, in one embodiment. The depth data frames produced by the depth sensor 46 may use significant bandwidth to transfer the depth data frames to the sensor controller 22. The sensor controller 22 may mitigate the bandwidth requirement in one embodiment by requesting the natural interaction sensor 40 transmit only the depth data frames, only video data from the optical sensor 44, or a combination of the depth data frames and the video data.

The optical sensor 44 may be implemented as a digital video camera, digital still frame camera, or other suitable optical sensors (e.g., charge coupled device(s)) capable of producing image data at a suitable frame rate per second which comprises a plurality of data points, which will be described herein as pixels by way of example. The plurality of pixels may be logically subdivided into a plurality of groups of pixels. The optical sensor 44 may produce a sequence of data frames comprising frames of video data or still image data. In one embodiment, the optical sensor 44 may be configured for a resolution of about 640×480 pixels and may be configured to produce the sequence of data frames at a frame rate of between 30-290 frames per second. However, it will be understood by one skilled in the art that the resolution and the frame rate of the optical sensor 44 may vary. For example, the optical sensor 44 may produce the sequence of data frames where each data frame may be comprised of a plurality of pixels in a data matrix [I,J], where I and J are greater than 1, but less than 60,000. The data matrix may be a color data matrix. I, of the data matrix, may be representative of a horizontal field of view [i] array, where i is equal to 1 to N. J, in the data matrix, may be representative of a vertical field of view [j] array, where j is equal to 1 to M. N and M, in some embodiments, may represent a maximum pixel value of the respective field of view arrays. The data matrix [I,J] may be used to detect web edges by an image contrast principle in which changes in color values between the material web 12 and the background 14 are used to locate the edges of the material web 12.

In one embodiment, the video data from the optical sensor 44 may be produced in a 32 bit red-green-blue-alpha (RGBA) format where the A component is not used. The alpha value may be used to control pixel transparency when rendering images on an output device, such as a display. RGBA may support 16 million colors by virtue of 24 bits of color information spread across the RGB components. It should be understood that other color spaces can be used, such as a Hue-Saturation Value (HSV) color space.

The audio sensors 48 may be implemented as one or more microphones or other sensor capable of or configured to receive and interpret audio signals such as sound waves, and be used to produce a sequence of data frames indicative of sonic aspects of the material web 12 such as quality inspection aspects and tracking and guidance aspects, for example. In one embodiment, the audio sensors 48 may be configured to receive audio signals in a frequency or pattern indicative of a quality inspection aspect of the material web 12 such as misalignment within the web handling system 10, termination of the material web 12, or other tracking, guidance and quality inspection aspects which may produce detectable audio signals. For example, a baseline audio recording can be made when the material web 12 is being handled properly, and deviations from the baseline can be detected by comparing the sonic aspects of the material web 12 with the baseline. As an example, a fourier analysis of the baseline audio recording can be generated to identify the frequencies in the baseline audio recording. Then, a fourier analysis of the sonic aspects of the material web 12 can be generated in real-time during web handling. The absence of certain frequencies and/or addition of certain frequencies can be used to generate an error signal to sound an alarm or take other appropriate action such as stopping the movement of the material web 12.

The sequence of data frames produced by the optical sensors 44, the depth sensor 46, and the audio sensors 48 may be synchronized such that the sequence of data frames produced by each of the sensors 20 may be transmitted simultaneously to the sensor controller 22. The synchronized sequence of data frames may be used to perform redundant operations such as error checking of one of the sequence of data frames from the optical sensors 44, the depth sensor 46, or the audio sensors 48.

Figure 3:
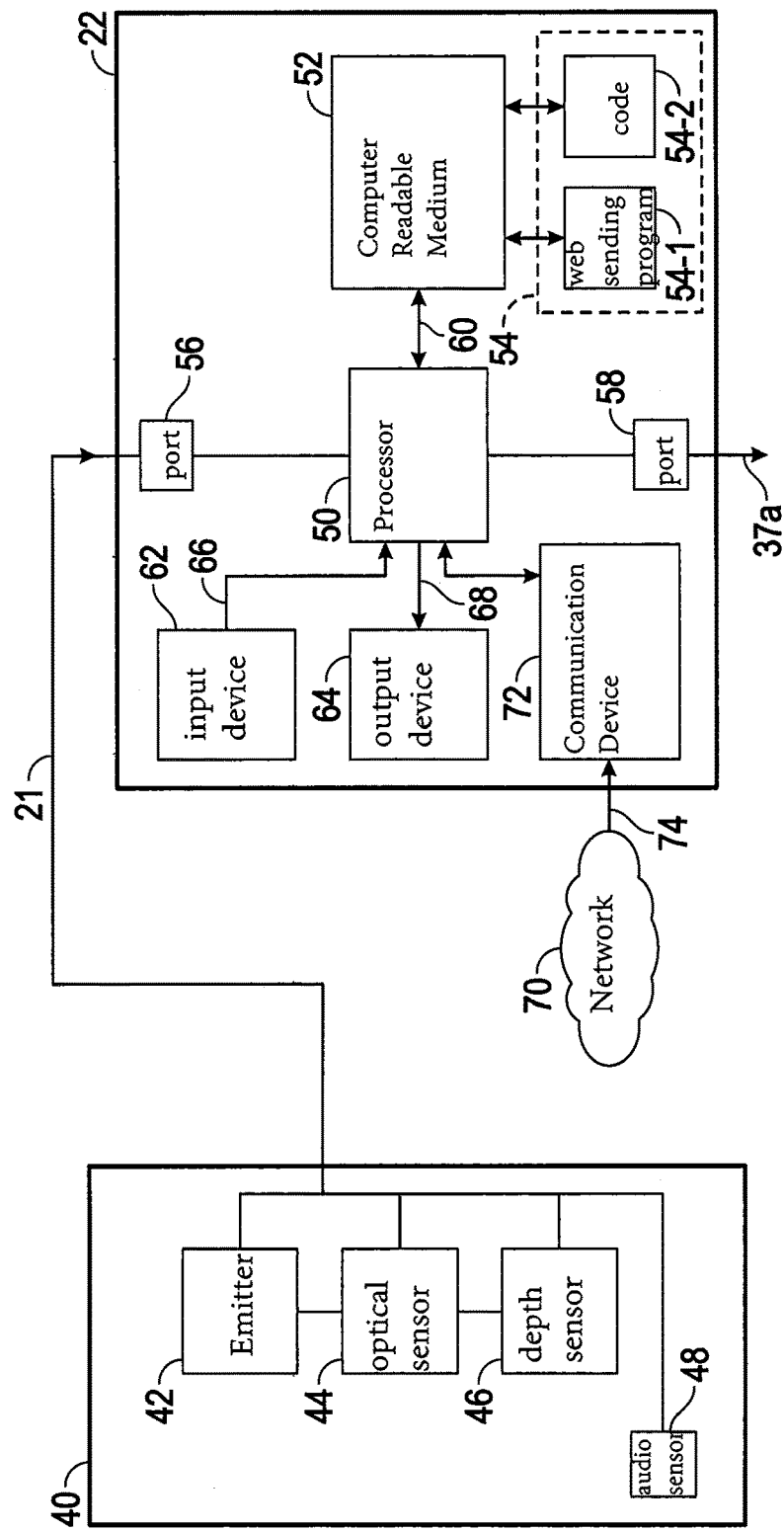
FIG. 3 is a schematic view of a sensor controller in accordance with the present disclosure.

Referring now to FIG. 3, the sensor controller 22 may comprise one or more processor 50, one or more non-transitory computer readable medium 52, processor executable code 54 stored on the one or more non-transitory computer readable medium 52, a first port 56 and a second port 58 coupled to the processor 50. The one or more non-transitory computer readable medium 52 may store a set point indicative of a desired location of a feature extending along the material web 12, and logic indicative of information identifying properties of a first group of pixels of the feature of the material web 12. The one or more processor 50 may be configured to analyze the one or more sequence of data frames captured by the natural interaction sensor 40, scan the sequence of data frames to locate a lateral location of a transition, and generate a series of location signals indicative of the lateral locations of the transition with the data frames. The lateral locations can be compared to the set point to generate an error signal indicative of a difference in location of the transition relative to the set point. The first port 56 may be configured to receive the sequence of data frames and may also be configured to receive transceiver outputs from the plurality of sensors 20 of the natural interaction sensor 40 generating the data matrix [I,J] and the depth data d[I,J]. The second port 58 may be configured to output control information, such as error signals. In particular, the second port 58 may also be configured to output edge data for one or more edges of the material web 12 including lateral position and polarity. The second port 58 may also be configured with separate depth output, for determining plane change, roll diameter sensing, edge sensing, and the like.

The one or more processor 50 may be implemented as a single processor 50 or multiple processors 50 working together or independently to execute the processor executable code 54 described herein. Embodiments of the processor 50 may include a digital signal processor (DSP), a central processing unit (CPU), a microprocessor, a multi-core processor, and combinations thereof. The processor 50 is coupled to the non-transitory computer readable medium 52. The non-transitory computer readable medium 52 can be a single non-transitory computer readable medium, or multiple non-transitory computer readable medium functioning logically together or independently.

The processor 50 is coupled to and configured to communicate with the non-transitory computer readable medium 52 via a path 60 which can be implemented as a data bus, for example. The processor 50 may be capable of communicating with an input device 62 and an output device 64 via paths 66 and 68, respectively. Paths 66 and 68 may be implemented similarly to, or differently from path 60. For example, paths 66 and 68 may have a same or different number of wires and may or may not include a multidrop topology, a daisy chain topology, or one or more switched hubs. The paths 60, 66 and 68 can be a serial topology, a parallel topology, a proprietary topology, or combination thereof.

The processor 50 is further capable of interfacing and/or communicating with one or more network 70, via a communications device 72 and a communications link 74 such as by exchanging electronic, digital and/or optical signals via the communications device 72 using a network protocol such as TCP/IP. The communications device 72 may be a wireless modem, digital subscriber line modem, cable modem, Network Bridge, Ethernet switch, direct wired connection or any other suitable communications device capable of communicating between the processor 50 and the network 70. It is to be understood that in certain embodiments using more than one processor 50, the processors 50 may be located remotely from one another, located in the same location, or comprising a unitary multicore processor (not shown). The processor 50 is capable of reading and/or executing the processor executable code 54 and/or creating, manipulating, altering, and storing computer data structures into the non-transitory computer readable medium 52.

The non-transitory computer readable medium 52 stores processor executable code 54 and may be implemented as random access memory (RAM), a hard drive, a hard drive array, a solid state drive, a flash drive, a memory card, a CD-ROM, a DVD-ROM, a BLU-RAY, a floppy disk, an optical drive, and combinations thereof. The non-transitory computer readable medium 52 may also store the sequence of data frames, the set point, and other information. When more than one non-transitory computer readable medium 52 is used, one of the non-transitory computer readable mediums 52 may be located in the same physical location as the processor 50, and another one of the non-transitory computer readable mediums 52 may be located remote from the processor 50. The physical location of the non-transitory computer readable mediums 52 can be varied and the non-transitory computer readable medium 52 may be implemented as a "cloud memory," i.e. non-transitory computer readable medium 52 which is partially or completely based on or accessed using the network 70. In one embodiment, the non-transitory computer readable medium 52 may store a database of sensor data accessible by the sensor controller 22 to serve as baseline set points, desired aspect, or desired locations of the material web 12 used in comparison with sensor data taken at distinct instants of time for guiding the material web 12. The database may include one or more set points indicative of a desired location of one or more features of the material web 12, web handling information indicative of a desired aspect of a feature of the material web 12, quality aspect information indicative of a desired quality of the material web 12, other sensor data, and combinations thereof. In this embodiment, the non-transitory computer readable medium 52 may also store sensor data from the one or more audio sensor 48. In another embodiment, the one or more non-transitory computer readable medium 52 may store web handling information indicative of a desired aspect of a feature of the material web 12. The desired aspect of the feature of the material web 12 may be a web plane change, such as the distance between the material web 12 and the natural interaction sensor 40, a width of the material web 12, a quality of the material web 12 with respect to a stored image, a defect in the material web 12, a tension of the material web 12, a roll diameter aspect, or one or more positional aspects of the material web 12 such as its lateral position of the material web 12 on the steering roller 28a, for example. In another embodiment, the one or more non-transitory computer readable medium 52 may store web handling information indicative of a desired location and a desired quality inspection aspect of the feature of the material web 12. The web handling information indicative of the desired quality inspection aspect may comprise a control image serving as a quality standard against which images of the material web 12 taken using certain of the plurality of sensors 20 may be compared to determine one or more qualities of the material web 12.

The first port 56 may be configured to receive a data stream indicative of the sequence of data frames from the natural interaction sensor 40. The first port 56 may transmit the received data stream to the processor 50, and can be implemented as a USB port, HDMI port, Firewire port, DIN port, digital video port, D-subminiature port, Ethernet port, SCSI port, fiber optics port, infrared port, optical port, or other suitable port. In one embodiment, for example, the first port 56 may be implemented as a plurality of first ports 56 such as a plurality of USB hubs, such that each of the plurality of sensors 20, including the depth sensor 46 and the optical sensor 44 of the natural interaction sensor 40 may be isolated on individual USB hubs. The first port 56 may be configured to receive a sequence of signals, such as the sequence of data frames, from a topographic sensor, such as the depth sensor 46, having a field of view encompassing a feature of the material web 12 and providing information indicative of the three dimensional location of the web material 12 and/or the background 14 (preferably relative to the topographic sensor), where the sequence of signals may include a series of depth maps. In another embodiment, the first port 56 may be configured to receive the sequence of data signals from the topographic sensor with a field of view encompassing a feature of the material web 12 and to receive a sequence of video frames of the feature of the material web 12, from an optical sensor such as the optical sensor 44. In this embodiment, the sequence of signals may include a series of depth maps and the sequence of video frames may be synchronized with the depth maps so that the three-dimensional information in the depth maps, as well as the visual information within the video frames can be used to guide or otherwise handle the material web 12, as described herein.

The data stream received by the first port 56 may include the sequence of data frames captured at distinct instants of time by the natural interaction sensor 40. The sequence of data frames may comprise a first group of data points, which may be pixels depicting a first feature, a second group of data points, which may be pixels depicting a second feature with the second feature spaced a distance transversely from the first feature, and a third group of data points, which may be pixels depicting a background transverse to the first and second feature. The third group of pixels may also depict a third feature with the third feature spaced a distance transversely from the first feature and the second feature. The sequential data frames may comprise a plurality of depth maps, where a first group of data points, which may be pixels are indicative of a first distance between a topographic sensor and a feature of the material web 12, and a second group of data points, which may be pixels are indicative of a second distance between the topographic sensor and the background 14, where the second distance is greater than the first distance to cause a transition in depth that can be detected. The sequence of data frames may comprise a sequence of data signals from a topographic sensor having a field of view encompassing a feature of a web, the sequence of signals including a series of depth maps. Further, the sequence of data frames may also include a sequence of video frames of first, second, and/or third feature synchronized with the depth maps so that the location of the edges of the material web 12 can be determined in multiple ways as discussed below.

The second port 58 is configured to output one or more signals from the one or more processor 50. The second port 58 receives the one or more signals from the processor 50, and may transmit the one or more signals to the web controller 24 configured to control aspects of the travel of a material web 12. The second port 58 may be implemented as a USB port, HDMI port, Firewire port, DIN port, digital video port, D-subminiature port, Ethernet port, Modbus port, SCSI port, fiber optics port, infrared port, optical port, or other suitable port.

The one or more signals may comprise one or more error signal indicative of a difference in location of a transition relative to the set point for a material web 12. The error signal may also be indicative of a difference in location of a first transition and/or a second transition relative to the set point. Further, the error signal may be indicative of a difference between a desired aspect and a web handling information stored on the one or more non-transitory computer readable medium. The error signal may also be indicative of a difference between a desired location and current locations of a web edge, for example. In another embodiment, the error signal may be indicative of desired and current quality inspection aspects. The error signal may also be indicative of a difference in location of a transition relative to a set point.

The input device 62 transmits data to the processor 50, and can be implemented as a keyboard, a mouse, a touch-screen, a camera, a cellular phone, a tablet, a smart phone, a PDA, a microphone, a network adapter, a camera, a scanner, and combinations thereof. The input device 62 may be located in the same location as the processor 50, or may be remotely located and/or partially or completely network-based. The input device 62 communicates with the processor 50 via path 66.

The output device 64 transmits information from the processor 50 to a user, such that the information can be perceived by the user. For example, the output device 64 may be implemented as a server, a computer monitor, a cell phone, a tablet, a speaker, a website, a PDA, a fax, a printer, a projector, a laptop monitor, and combinations thereof. The output device 64 communicates with the processor 50 via the path 68.

The network 70 may permit bi-directional communication of information and/or data between the processor 50 and the network 70. The network 70 may interface with the processor 50 in a variety of ways, such as by optical and/or electronic interfaces, and may use a plurality of network topographies and protocols, such as Ethernet, TCP/IP, circuit switched paths, file transfer protocol, packet switched wide area networks, and combinations thereof. For example, the one or more network 70 may be implemented as the Internet, a LAN, a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and combinations thereof. The network 70 may use a variety of network protocols to permit bi-directional interface and communication of data and/or information between the processor 50 and the network 70. For example, in one embodiment, the bi-directional communication of information via the network 70 may facilitate communication between the processor 50, the one or more non-transitory computer readable medium 52, the natural interaction sensor 40, and/or one or more remote monitors of the web handling system 10.

The one or more non-transitory computer readable medium 52 may store the processor executable code 54, which may comprise a web sensing program 54-1. The non-transitory computer readable medium 52 may also store other processor executable code 54-2 such as an operating system, such as Windows, iOS, or Linux, and applications programs such as a word processor, for example. The processor executable code for the web sensing program 54-1 and the other processor executable code 54-2 may be written in any suitable programming language, such as C++, C#, Java, or Python, for example. The web sensing program 54-1 may also be written using application programming interfaces, for example. In one embodiment, all or a portion of the web sensing program 54-1 may be stored on one or more computer readable medium within the natural interaction sensor 40.

Figure 4:
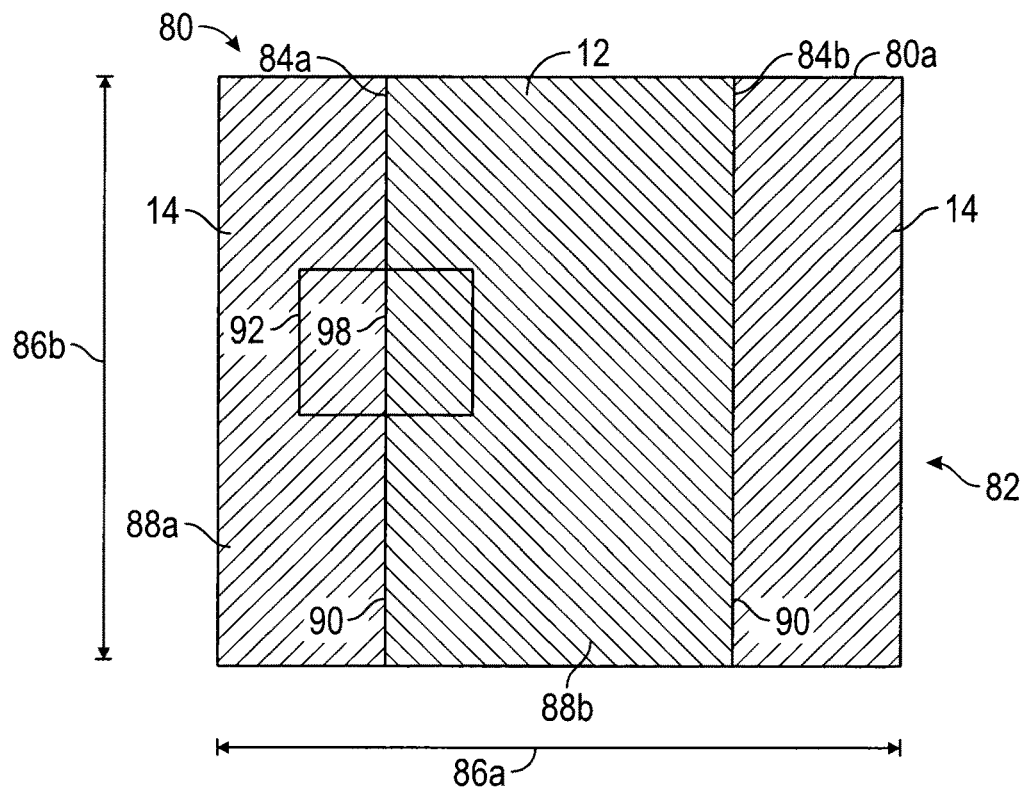
FIG. 4 is a diagrammatic representation of an image data frame captured by a natural interaction sensor in accordance with the present disclosure.

Referring now to FIG. 4, in one embodiment, the web sensing program 54-1 may cause the processor 50 to receive a sequence of image data frames 80. FIG. 4 shows an exemplary embodiment of a image data frame 80a from the sequence of image data frames 80. In this embodiment, the sequence of image data frames 80 is captured by the optical sensor 44 and a field of view 82 encompasses the web material 12 and the background 14. The image data frame 80a as captured by the optical sensor 44 may be a raw image and provided to the processor 50 as a processed image, such as a raster image, via the processor 41 of the natural interaction sensor 40. In this embodiment, each image data frame 80a of the sequence of image data frames 80, output by the optical sensor 44 to the processor 50, may be represented by a color image data matrix [I,J].

The image data frame 80a has a field of view 82 encompassing at least a portion of the material web 12. As shown in FIG. 4, the field of view 82 shows the material web 12 with a first edge 84a and a second edge 84b and the background 14 extending past the first and second edges 84a and 84b. The field of view 82 may be understood as a horizontal field of view 86a and a vertical field of view 86b, where the horizontal field of view 86a is indicative of an array of pixels [I] of the data matrix [I,J] and the vertical field of view 86b is indicative of an array of pixels [J] of the data matrix [I,J]. The array of pixels [I] may have a value of 1 to N, while the array of pixels [J] may have a value of 1 to M. For example, for the image data frame 80a may have a resolution of 640×480 pixels. In this example, the array of pixels [I] is 640 pixels and the array of pixels [J] is 480 pixels. As discussed above, a ratio of the horizontal field of view 86a/vertical field of view 86b may be in a range from 0.1 to 100, and is more desirably in a range from 1.3 to 1.7. In one embodiment, the ratio of the horizontal field of view 86a/vertical field of view 86b is 640:480, and in another embodiment is 16:9.

Figure 5:
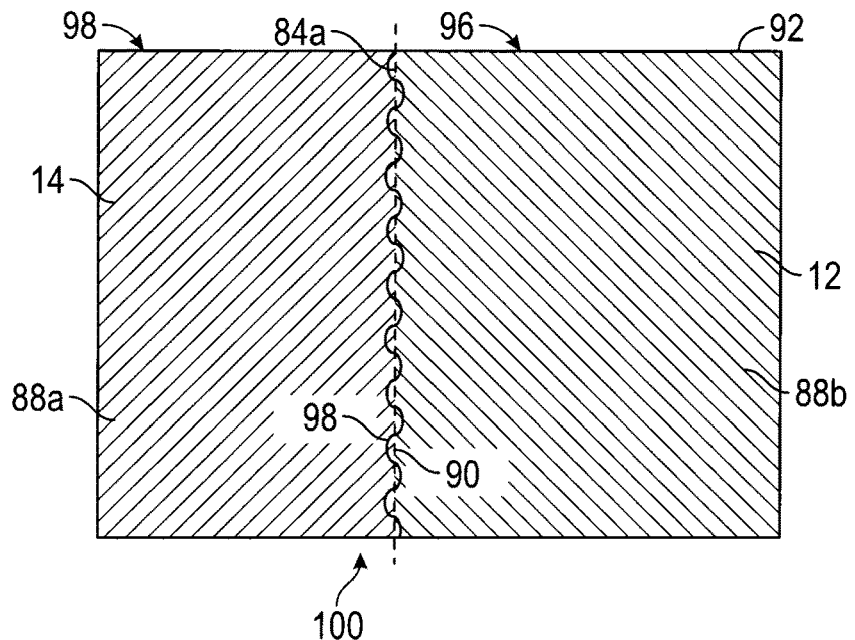
FIG. 5 is a diagrammatic representation of a subset of pixels represented in the image data frame of FIG. 4.

In the embodiment shown in FIG. 4, the background 14 may be a first color 88a and the material web 12 may be a second color 88b to cause the image data frame 80a to have first color values indicating the background 14 and second color values indicating the material web 12. The first edge 84a and the second edge 84b of the material web 12 may create a transition 90 between the first color values indicating the first color 88a and the second color values indicating the second color 88b. The transitions 90, located at the first or second edges 84a and 84b, may be indicated by a range of pixels in the horizontal field of view 86a and a range of pixels in the vertical field of view 86b, with the range of pixels in the horizontal and vertical fields of view 86a and 86b in one embodiment being in a range from 1 to 60,000. For example, due to the resolution of the optical sensor 44, the transition 90 may be a transition from the background 14, which may be dark, to the material web 12, which may be light. The transition 90 may be spread across a range of several pixels in the horizontal field of view 86a and may span the entire vertical field of view 86b in the range of pixels in the horizontal field of view 86. As another example, FIG. 5 shows a subset of pixels 92 of the image data frame 80a where the transition 90 is at the first edge 84a and the first edge 84a may be uneven or ragged. In this embodiment, a location of the transition 90 may be indicated by averaging or otherwise scanning the values of a range of pixels in the horizontal field of view 86a and a range of pixels in the vertical field of view 86b because of the uneven nature of the first edge 84a. The location of the transition 90 within the image data frame 80a and other data frames within the sequence of image data frames 80 can be determined by the web sensing program 54-1 to determine the location of the first edge 84a in real-time as the image data frames 80 are captured and sent to the sensor controller 22 to guide the material web 12, as will be explained in more detail below.

Figure 6:
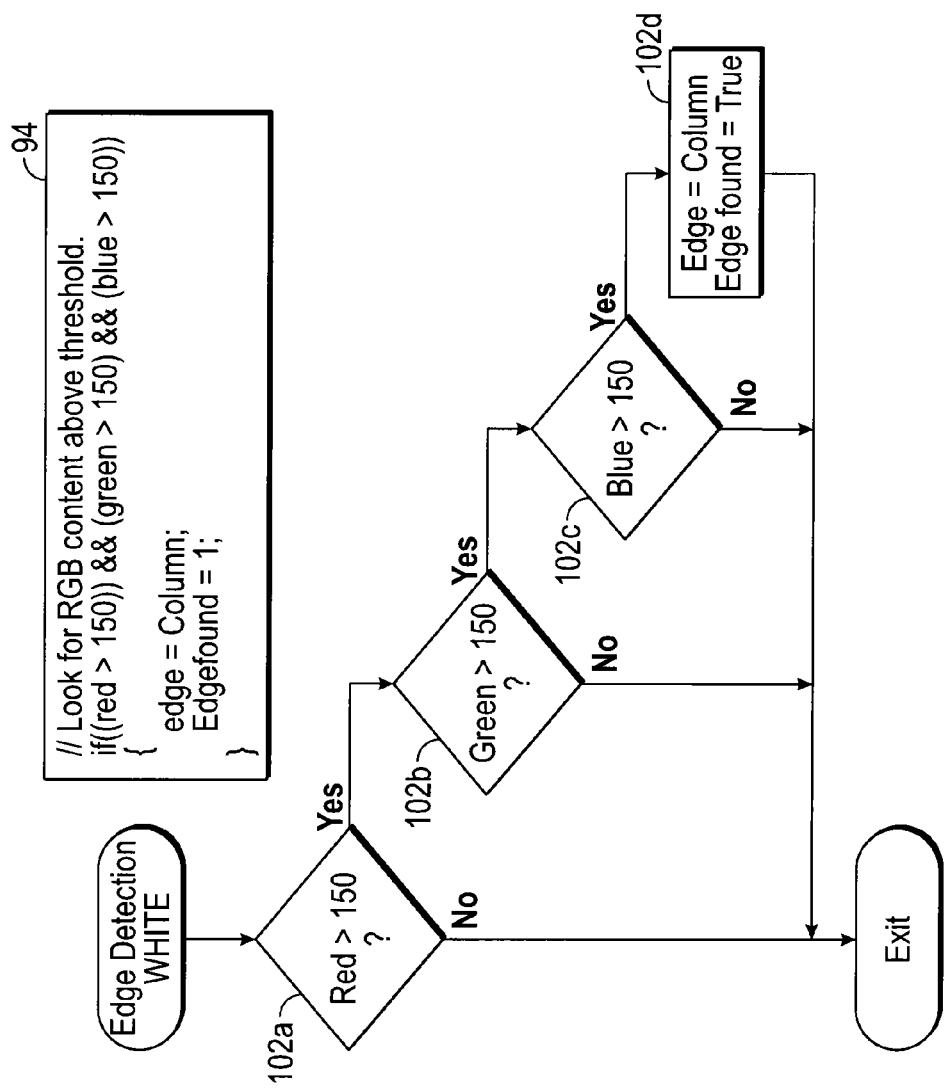
FIG. 6 is a diagrammatic representation of a logic process that can be executed by one or more processors of a sensor controller to determine a transition in the image data frame of FIG. 4 in accordance with one aspect of the present disclosure.

Referring now to FIG. 6, therein shown is a diagrammatic representation of one embodiment of logic 94 to determine a feature 98 of the material web 12 within a first group of pixels 96. The feature 98 can be the location of the transition 90 indicative of the location of the first edge 84a, for example. The logic 94 may also be indicative of information identifying properties of a second group of pixels 100, such as the background 14, as shown in FIG. 5. The logic 94 causes the processor 50 to scan the sequence of image data frames 80 to determine the transition 90 between the first color 88a and the second color 88b, representing the transition 90 between the background 14 and the material web 12 and indicating the first edge 84a. In determining the transition 90, the logic 94 may cause the processor 50 to scan each pixel of the image data frame 80a to determine a first color value 102a, a second color value 102b, and a third color value 102c. The first, second, and third color values 102a-102c may be representative of a color balance of the first color 88a and the second color 88b of the image data frame 80a.

As shown in FIG. 6, the logic 94 is looking for the color white, for example, which is indicated by RGB color values where a red content is greater than 150, a green content is greater than 150, and a blue content is greater than 150. The transition 90 may be located by scanning each pixel to determine a color balance for the pixel. The logic 94 may cause the processor 50 to scan each row of pixel data for a contrast between the first color 88a and the second color 88b. When the transition 90 is crossed, an edge may be declared at a current column counter, marking the row and column at which the transition 90 is detected. In this embodiment, if any of the first, second, or third color values 102a-102c is determined to be below a predetermined threshold, the color of the pixel may be identified as the first color 88a, indicative of the background 14. However, if the first, second, and third color values 102a-102c are above the predetermined threshold, the logic 94 may cause the processor 50 to identify the pixel as being the second color 88b, indicative of the material web 12 and branch to a step 102d where the processor 50 stores a value indicating a column number of the first end 84a. The logic 94 may determine the first, second, and third color values 102a-102c sequentially, in any order, as shown in FIG. 6, or may determine the first, second, and third color values 102a-102c at the same time. The logic 94 may cause the processor 50 to store a pixel value or a range of pixel values where the transition 90 occurs in the step 102d, for example where pixel value or range of pixel values delineate the transition 90 where the first color 88a lies on a first side of the transition 90 and the second color 88b lies on a second side of the transition 90, opposite the first side of the transition 90.

To account for ragged or non-linear edges, the logic 94 may cause the processor 50 to determine the transition 90 at a single pixel value along the horizontal field of view 86a, by averaging and comparing multiple pixel values adjacent to the single pixel value along the vertical field of view 86b. In this instance, the multiple pixel values may include two or more pixel values where an upper limit of the pixel values is the maximum number of pixel values in the vertical field of view 86b. In this instance, the transition 90 may be located at or about the center of the range of pixel values along the horizontal field of view 86a.

Figure 7:
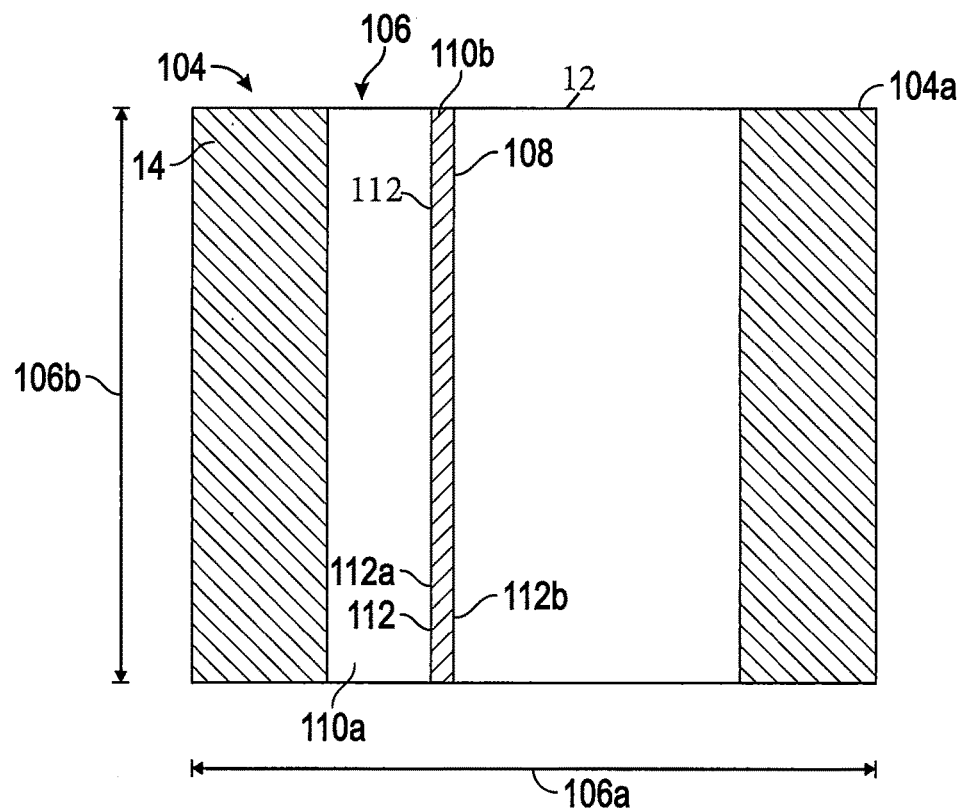
FIG. 7 is a diagrammatic representation of another embodiment of an image data frame captured by the natural interaction sensor in accordance with another version of the present disclosure.

Referring now to FIG. 7, in one embodiment, the web sensing program 54-1 may cause the processor 50 to receive a sequence of image data frames 104. FIG. 7 shows an exemplary embodiment of an image data frame 104a from the sequence of image data frames 104. In this embodiment, the sequence of image data frames 104 is captured by the optical sensor 44. The image data frame 104a, as captured by the optical sensor 44, may be similar to the image data frame 80a described above. However, the image data frame 104a may encompass a field of view 106 showing the background 14, the material web 12, and a graphic 108. The graphic 108 is a line extending longitudinally along a predominant surface of the material web 12. The field of view 106 may be logically divided into a horizontal field of view 106a and a vertical field of view 106b, similar to the horizontal field of view 86*a* and the vertical field of view 86*b*, respectively, and similarly forming a data matrix [I,J].

Figure 8:
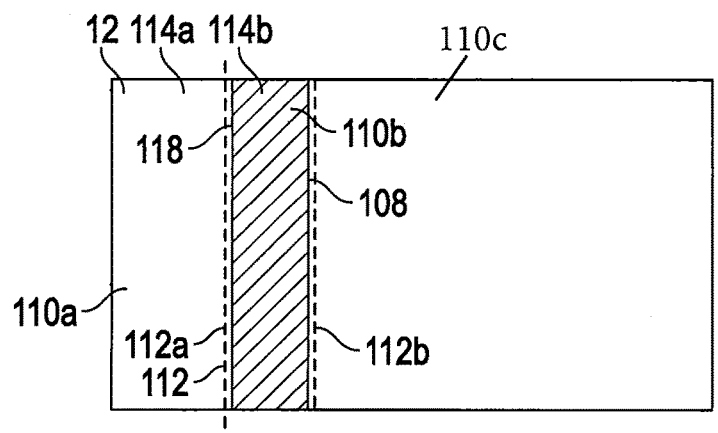
FIG. 8 is a diagrammatic representation of a subset of pixels represented in the image data frame of FIG. 7.

In the embodiment shown in FIG. 7, the image data frame 104*a* may depict the background 14, the material web 12, and the graphic 108. The material web 12 may be indicated by a color values indicating a first color 110*a* and the graphic 108 may be indicated by color values indicating a second color 110*b* causing one or more transition 112 between the first color 110*a* of the material web 12 and the second color 110*b* of the graphic 108. Where the graphic 108 creates two transitions 112, as shown in FIG. 8, the two transitions 112 may be opposite one another, where a first transition 112*a* is a transition between the first color 110*a* and the second color 110*b* and a second transition 112*b* may be a transition between the second color 110*b* and the first color 110*a* (not shown) or a third color 110*c*. Regardless of the embodiment, the one or more transition 112 may be indicated, similar to the transition 90, by a single pixel value or a range of pixel values in the horizontal field of view 106*a* and a range of pixel values in the vertical field of view 106*b*. The one or more transition 112 may be used by the web sensing program 54-1 to guide the material web 12, as will be explained in more detail below. The image data frame 104*a* may be logically divided into a plurality of groups of pixels 114.

Figure 9:
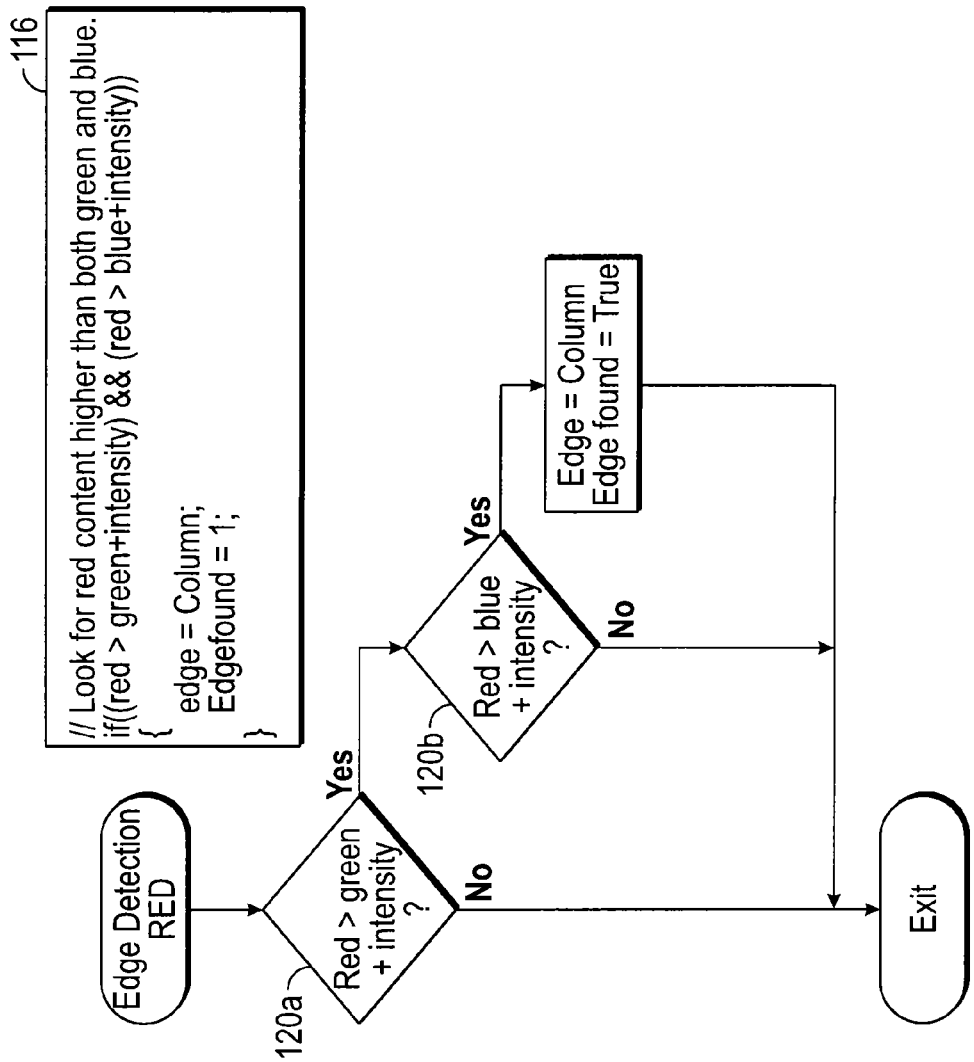
FIG. 9 is a diagrammatic representation of a logic process for determining a transition in the image data frame of FIG. 7 in accordance with yet another aspect of the present disclosure.

Referring now to FIG. 9, therein shown is a diagrammatic representation of one embodiment of logic 116 to identify properties of a first group of pixels 114*a* having a feature 118 of the material web 12 which has reddish color, by way of example. In this embodiment, the first group of pixels 114*a*, shown in FIG. 8, is indicative of the material web 12. The logic 116 may also be indicative of information identifying properties of a second group of pixels 114*b*, representing the graphic 108, for example. The logic 116 may cause the processor 50 to scan the sequence of image data frames 104 to determine the transition 112 between the first color 110*a* and the second color 110*b*, representing the transition 112 between the material web 12 and the graphic 108. In determining the transition 112, the logic 116 may cause the processor 50 to scan each pixel of the image data frame 104*a* to determine a first relative color intensity 120*a* and a second relative color intensity 120*b*. The first relative color intensity 120*a* may be indicative of the color intensity of red over green, and the second relative color intensity 120*b* may be indicative of the color intensity of red over blue, for example. In this embodiment, the second color 110*b*, the graphic 108, may be predominantly red in color indicating a higher intensity of red than green or blue. However, it will be understood by one skilled in the art that the relative color intensity may identify the second color 110*b* by the intensity of a predominant color of the second color regardless of whether it is red, blue, or green. The logic 116 may determine a singular pixel value in the horizontal field of view 106*a* and the vertical field of view 106*b* where the transition 112 between the first color 110*a* and the second color 110*b* occurs. Although explained in reference to a single transition 112, it will be understood by one skilled in the art that the logic 116 may determine any number of transitions 112 and may average pixel values in the vertical field of view 106*b* to even out false detections which may occur due to ragged transitions or the like.

As shown in FIG. 9, the logic 116 may determine the transition 112 by scanning each pixel to determine the relative intensities of the colors within the pixel. The logic 116 may cause the processor 50 to scan a range of rows of pixel data for a contrast between the first color 110*a* and the second color 110*b*. When the transition 112 is crossed, an edge, representing the edge of the graphic 108, may be declared at a current column counter, and the processor 50 may store the row and column at which the transition 112 is detected. In this embodiment, if either the first relative color intensity 120*a* or the second relative color intensity 120*b* of the predominant color is determined to be below a color to which it is compared, the color of the pixel may be identified as the first color 110*a*. If the first relative color intensity 120*a* and the second relative color intensity 120*b* of the predominant color is greater than the colors to which the predominant color is compared, the pixel may be identified as the second color 110*b*. After identifying each pixel within the image data frame 104*a* as being either the first color 110*a* or the second color 110*b*, the logic 116 may cause the processor 50 to store a pixel value or a range of pixel values where the transition 112 occurs, for example where the pixel value or range of pixel values delineate the transition 112 where the first color 110*a* lies on a first side of the transition 112 and the second color 110*b* lies on a second side of the transition 112, opposite the first side of the transition 112. The logic 116 may determine the first and second relative color intensities 120*a* and 120*b* in any order or at the same time.

Where the logic 116 causes the processor 50 to determine the transition 112 occurs at column along the horizontal field of view 106*a* and a range of pixel values along the vertical field of view 106*b*, the logic 116 may cause the processor 50 to identify the column as the transition 112. Where the logic 116 determines, as shown in FIG. 8, that the transition 112 occurs at a range of pixel values along the horizontal field of view 106*a* and a range of pixel values along the vertical field of view 106*b*, the logic 116 may cause the processor 50 to average the location of the transition 112 within the range of pixel values located along the horizontal field of view 106*a*. In this instance, the transition 112 may be located at or about the center of the range of pixel values along the horizontal field of view 106*a*.

Figure 10:
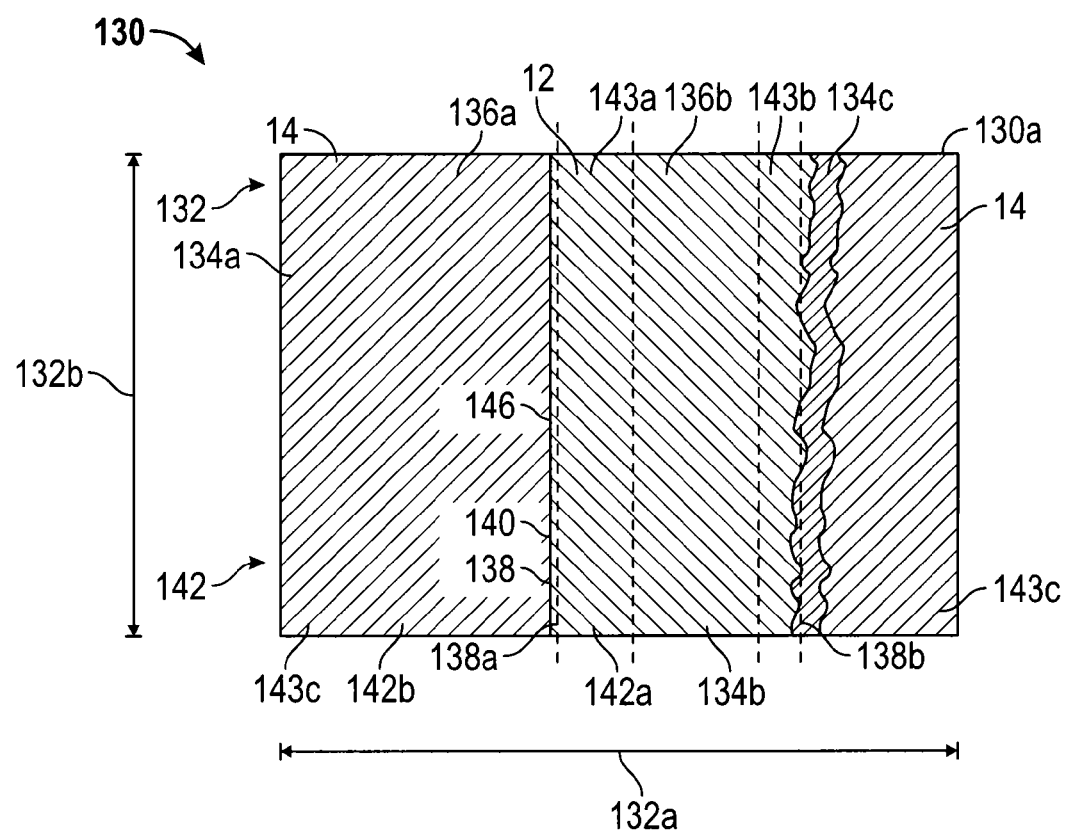
FIG. 10 is a diagrammatic representation of an embodiment of a depth data frame captured by the natural interaction sensor in accordance with the present disclosure.

Depicted in FIG. 10, in one embodiment, the web sensing program 54-1 may cause the processor 50 to receive a sequence of depth data frames 130 having pixel values indicating distances from the depth sensor 46. By way of example, FIG. 10 shows an exemplary embodiment of a depth data frame 130*a* from the sequence of depth data frames 130. In this embodiment, the sequence of depth data frames 130 is captured by the depth sensor 46 and may be representative of objects located at differing distances from the depth sensor 46. The depth data frame 130*a* may be represented graphically as an image with two or more colors, with each color representing a depth or a depth range relative to the depth sensor 46. In this embodiment, each depth data frame 130*a* of the sequence of depth data frames 130, output by the depth sensor 46 to the processor 50 may be represented by a matrix d[I,J], where each pixel within the depth data frame 130*a*, represented by the matrix d[I,J], is indicative of a distance measurement representing the distance of the object from the depth sensor 46 at a specified point. As shown in FIG. 10, the field of view 132 may be understood as a horizontal field of view 132*a* and a vertical field of view 132*b*, similar to the field of view 82 discussed in relation to the image data frame 80*a*. The sequence of depth data frames 130, of which the depth data frame 130*a* is a part, may be captured similar to the sequence of image data frames 80, as described above. In one embodiment, the sequence of depth data frames 130 may be captured by the depth sensor 46 at a resolution of 640×480 pixels and at a frame rate of 30 frames per second.

The field of view 132 encompasses at least a portion of the material web 12. As shown in FIG. 10, the data frame 132*a* shows a depth map of the material web 12 and the background 14, where the background 14 is represented by a first color 134a and the material web 12 is represented by a second color 134b. In this case, to obtain suitable values in the data frame 132a, the background 14 should be spaced a distance between a minimum resolution and a maximum sensing depth of the depth sensor 46. For example, the background 14 can be spaced between one (1) to ten (10) feet away from the material web 12. The first and second colors 134a and 134b may be graphical representations of a first distance 136a and a second distance 136b, respectively, from the depth sensor 46. It will be understood by those skilled in the art that the first distance 136a and the second distance 136b may be indicative of a distance measurement or a range of distance measurements, such that the first distance 136a and the second distance 136b do not overlap and show the location of the material web 12 relative to the background 14.

FIG. 10 also shows a third color 134c which may be indicative of a blind spot in the depth image due to the depth sensor 46 orientation relative to the material web 12. The depth data frame 130a may be created by painting the field of view 132 with infrared points of light from the emitter 42 and observing the resulting reflected image. The depth sensor 46 is spaced some distance apart from the emitter 42 which may cast a shadow where the emitted light is blocked by objects closer than the background 14. The shadow may appear to the depth sensor 46 because no light is detected in the shadow. The third color 134c may be reduced by changing location of the depth sensor 46 on a horizontal plane.

The depth data frame 130a may depict the background 14 indicated by the first color 134a and the material web 12 indicated by the second color 134b. A transition 138 may be created at an intersection of the first color 134a and the second color 134b indicative of a first edge 140 of the material web 12. The transition 138, similar to the transition 90, may be indicated by a range of pixels in the horizontal field of view 132a and a range of pixels in the vertical field of view 132b, similar to the ranges of pixels discussed with regards to transition 90. The depth data frame 130a may be logically divided, for example, along the line of the transition 138 into a plurality of pixels groups 142. For instance, the depth data frame 130a may be divided into a first group of pixels 142a and a second group of pixels 142b such that the first group of pixels 142a is representative of the material web 12 and the second group of pixels 142b is representative of the background 14 with a division between the first and second groups of pixels 142a and 142b occurring at the transition 138.

In another embodiment, the depth data frame 130a may be divided into a first group of pixels 143a depicting a first feature 146a of the material web 12, a second group of pixels 143b depicting a second feature 146b of the material web 12, and a third group of pixels 143c depicting the background 14. The second group of pixels 143b are spaced a distance transversely from the first group of pixels 143a. A first transition 138a and a second transition 138b may exist, with the first transition 138a between the first group of pixels 143a and the third group of pixels 143c and the second transition 138b between the second group of pixels 143b and the third group of pixels 143c. A web handling signal may be generated based on the distance between the first transition 138a and the second transition 138b.

Figure 11:
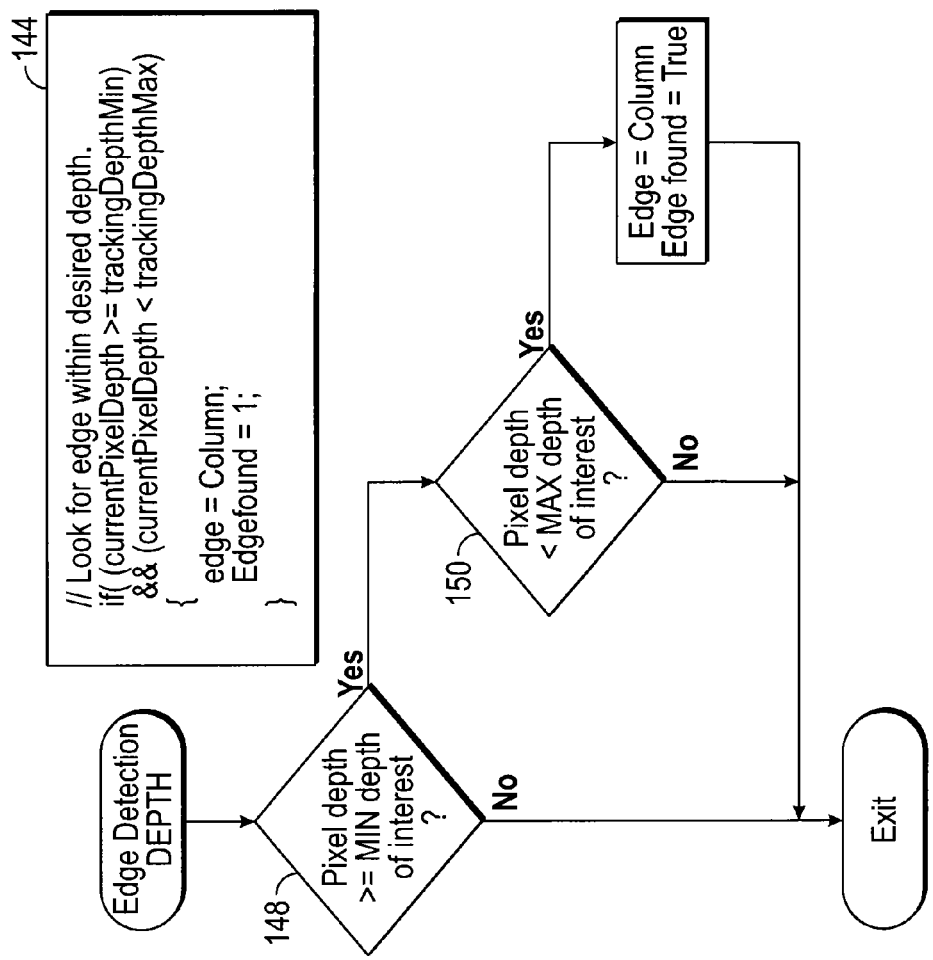
FIG. 11 is a diagrammatic representation of a logic process that can be executed by one or more processors of a sensor controller to determine a transition in the depth data frame of FIG. 10 in accordance with the present disclosure.

Referring now to FIG. 11, therein shown is a diagrammatic representation of one embodiment of logic 144 to determine the location or other properties of a feature 146 of the material web within the first group of pixels 142a. In this embodiment, the first group of pixels 142a is indicative of the material web 12 and the feature 146 is indicative of the first edge 140 of the material web 12. The logic 144 may also be indicative of information identifying properties of the second group of pixels 142b, which may represent the background 14. The logic 144 may cause the processor 50 to scan the sequence of depth data frames 130 to determine the transition 138 between the first distance 136a, represented by the second group of pixels 142b and the first color 134a, and a second distance 136b, represented by the first group of pixels 142a and the second color 134b. In determining the transition 138, the logic may cause the processor 50 to scan each row of pixel data for a contrast between the first distance 136a and the second distance 136b. When the contrasting transition 138 is crossed, an edge, representing the edge 140 of the material web 12, may be declared at a current column counter, and the processor 50 may store the row and column at which the transition 138 is detected.

For example, as shown in FIG. 11, the logic 144 may determine the transition 138 by causing the processor 50 to scan each pixel, as described above, to determine whether the distance measurement for each pixel is above or equal to a minimum depth of interest, at block 148. The logic 144 may then cause the processor 50 to determine, for each pixel, whether the distance measurement is less than a maximum depth of interest, at block 150. The logic 144 may scan each pixel in a row determining whether the distance measurement for each pixel is above or equal to the minimum depth of interest and less than the maximum depth of interest. Pixels depicting the background 14 may be represented by distance measurements which are above the minimum depth of interest, but exceed the maximum depth of interest. Pixels depicting the material web 12 may be represented by distance measurements which are above or equal to the minimum depth of interest and do not exceed the maximum depth of interest. The processor 50 may sequentially scan each pixel, stepping through columns within a row, until determining that a distance measurement for a pixel meets the requirements of both blocks 148 and 150, thereby identifying a distance measurement of a pixel which is indicative of the first edge 140. The logic 144 may cause the processor 50 to store the location information, row and column, of the pixel indicating the transition 138 at the first edge 140. The logic 144 may cause the processor 50 to perform the above described steps for each row within the vertical field of view 132b. As the processor 50 scans the pixels of the depth data frame 130a, pixels indicative of the transition 138 may be found within a range of columns. The logic 144, as described above in relation to logic 94, may cause the processor 50 to store the range of columns, represented by a pixel range in the horizontal field of view 132a indicative of the transition 138.

In another embodiment of the logic 144, the logic may generate web handling signals based on the distance between the first transition 138a and the second transition 138b of the depth data frame 130a. The logic 144 may enable determination and storage of a set point indicative of a desired operational aspect of the material web 12 and the web handling signal may be indicative of an actual state of the first operational aspect of the material web 12. The first operational aspect of the material web 12 may be a tension of the material web 12, measured in one embodiment by the distance between the first transition 138a and the second transition 138b. In yet another embodiment, the first operational aspect of the material web 12 may be a desired location of the material web 12 and the web handling signal may be an error signal indicative of a difference in relative locations between the first and second transitions 138a and 138b of the set point. The generation and storage of the set point will be explained in more detail below.

Figure 12:
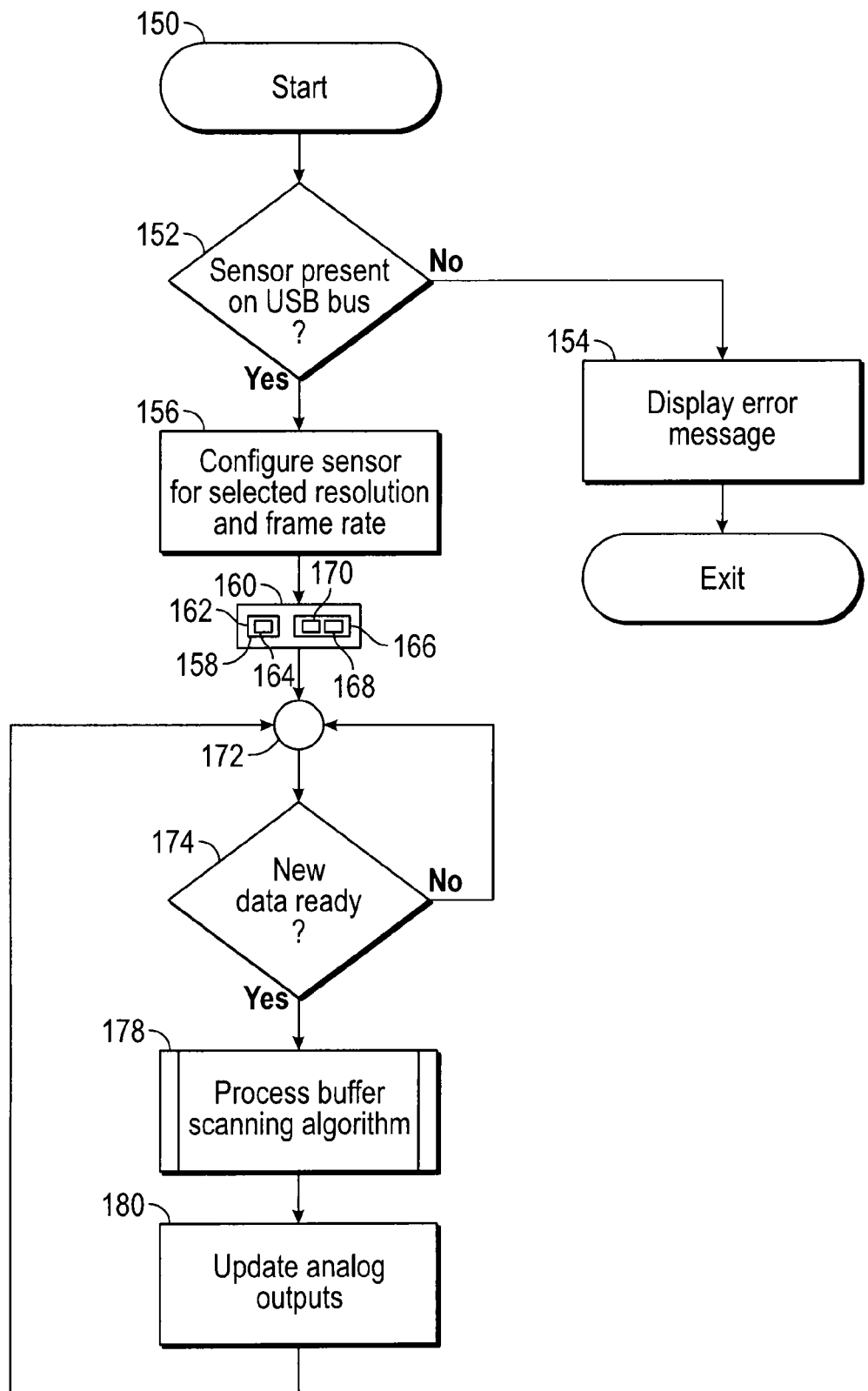
FIG. 12 is a diagrammatic representation of an embodiment of a web sensing program for guiding the material web in accordance with the present disclosure.

Referring now to FIG. 12, therein shown is a diagrammatic representation of one embodiment of the web sensing program 54-1. The processor 50 of the sensor controller 22 may execute the processor executable code for the web sensing program 54-1 at block 150. Execution of the web sensing program 54-1 may cause the processor 50 to determine whether the natural interaction sensor 40 is in communication with the processor 50, at block 152. Where the processor 50 determines the natural interaction sensor 40 is not in communication, the processor 50 may generate and display an error message at block 154. Where the natural interaction sensor 40 is in communication, the processor 50 may configure the natural interaction sensor 40 for a selected resolution and frame rate, at block 156. For example, as previously discussed, the resolution of the optical sensor 44 and the depth sensor 46 may be 640×480 pixels with a frame rate of 30 to 290 frames per second. However, it will be understood that the resolution and frame rate of the natural interaction sensor 40 may vary.

The web sensing program 54-1 may cause the natural interaction sensor 40 to capture a sequence of data frames 158 and cause the processor 50 to receive the sequence of data frames 158 from the natural interaction sensor 40 at block 160. The sequence of data frames 158 may be the sequence of data frames 80, 104, or 130, as described above, for example. The web sensing program 54-1 may cause the processor 50, receiving the sequence of data frames 158, to identify a desired location of a feature 162 within the sequence of data frames 158 and store a set point 164 indicative of the desired location of the feature 162. The feature 162 may be the feature 98, 118, or 146, as described above, for example. Once identified and stored, the set point 164 may be used to determine positional changes within the material web 12 traveling across the steering rollers 28 of the web handling system 10. The processor 50 may store the set point 164 in the one or more non-transitory computer readable medium 52. In one embodiment, the processor 50 may store a plurality of set points 164 for a plurality of features 162, for instance, where the web sensing program 54-1 is designed to guide the material web 12 by a plurality of edges, by an edge and a graphic, by depth data from the depth sensor 46 and the graphic captured by the optical sensor 44, by a feature of the background and a feature of the web, or where the web sensing program 54-1 is guiding a plurality of material webs 12, for example.

The web sensing program 54-1 may also cause the processor 50, at block 160 to store logic 166 indicative of information identifying properties of a first group of pixels 168 of the feature 162 of the material web 12. The logic 166 may be representative of the logic 94, 116, or 144, for example, and may be stored on the one or more non-transitory computer readable medium 52 by the processor 50. The logic 166 may also be indicative of information identifying properties of a second group of pixels 170. The first group of pixels 168 may be representative of the first group of pixels 96, 114a, or 142a and the second group of pixels 170 may be representative of the second group of pixels 100, 114b, or 142b, for example.

After the set point 164 and logic 166 have been stored, the processor 50 may cause the material web 12 to initiate travel through the web handling system 10. At block 172, the web sensing program 54-1 may cause the natural interaction sensor 40 to capture the sequence of data frames 158 at distinct instants of time, and cause the processor 50 to receive the sequence of data frames 158. At block 174, the web sensing program 54-1 may cause the processor 50 to determine whether new data is ready or whether each of the data frames in a current sequence of data frames 158 have been analyzed. If no new data is present, the web sensing program 54-1 may cause the processor to wait for new data. If new data is present, the web sensing program 54-1 may cause the processor 50 to execute the logic 166 to scan the pixels in the sequence of data frames 158 to locate a transition 176 between a property of the first group of pixels 168 and one or more property of the second group of pixels 170 with in the sequence of data frames 158, at block 178. The transition 176 may be representative of the transition 90, 112, or 138.

At block 180, the web sensing program 54-1 may cause the processor 50 to generate a series of error signals 182 indicative of a lateral location of the transition 176, and/or a difference in location of the transition 176 relative to the set point 164. The web sensing program 54-1 may also cause the processor 50 to output location signals and/or the error signals 182 at block 180. The location signals 182 may update the analog outputs of the web handling system 10 by transmitting the location signals 182 to the web controller 24 which may generate and transmit a control signal to the platform drive 26 to change the angular position of the platform 18 relative to the base 16 in order to adjust the lateral position, vertical or horizontal, of the material web 12. Adjustment of the lateral position of the material web 12 may be performed until a desired distance relationship between the transition 176 relative to the set point 164 is restored. The set point 164 can be stored in either the sensor controller 22 and/or the web controller 24.

In one embodiment of the web sensing program 54-1, the material web 12 is a first material web 12a, the feature 162 is a first feature 162a, the background 14 is a first background 14a, the transition 176 is a first transition 176a, the series of location signals and/or error signals 182 is a first series of location signals and/or error signals 182a. In this embodiment, the sequence of data frames 158 may be provided with a third group of pixels 171a depicting at least one second feature 162b extending in a web direction of travel on a second material web 12b, and a fourth group of pixels 171b depicting a second background 14b transverse to the second feature 162b. The web sensing program 54-1, in this embodiment, may cause the processor 50 to scan the sequence of data frames 158, as previously described, to locate a second transition 176b between the third group of pixels 171a and the fourth group of pixels 171b in the sequence of data frames 158. The web sensing program 54-1 may also cause the processor 50 to generate a second series of location signals and/or error signals 182b, similar to the series of location signals and/or error signals 182, indicative of the lateral locations of the second transition 176 within the data frames 158, and/or a difference in location of the second transition 176b relative to the set point 164.

In another embodiment, the web sensing program 54-1 may cause the processor 50 to monitor the material web 12, by causing the depth sensor 46 of the natural interaction sensor 40 to capture the sequence of data frames 158, which in this embodiment are indicative of a sequence of depth maps. The processor 50 may receive the sequence of data frames 158 and store web handling information indicative of a desired tension for the material web 12. In this embodiment, the web handling information may include the set point 164 indicative of the desired location of the feature 162. The feature 162 may be indicative of the desired web tension and be indicated by a measured width of the material web 12 as compared to a desired width of the material web 12. To determine the feature 162, the processor 50 may determine a desired width of a properly tensioned material web 12 from the depth sensor 46 and store that desired distance as the set point 164. The processor 50 may then execute the logic 166 which may cause the processor 50 to determine a current web tension of the material web 12 using at least one of the depth maps in the sequence of data frames 158. The processor 50 may then determine the error signal 182 indicative of a difference between the desired web tension and the current web tension and output the error signal 182. The error signal 182 may be output to the web controller 24 to correct web tension using known techniques.

In yet another embodiment, the web sensing program 54-1 may cause the processor 50 to determine a difference between a desired quality inspection aspect and a current quality inspection aspect. The processor 50 may receive the sequence of data frames 158 captured by the optical sensor 44 having a field of view encompassing at least a portion of the material web 12, wherein the sequence of data frames 158 is indicative of a sequence of signals. In this embodiment, the sequence of data frames 158 may be a sequence of images of the feature 162 captured by the optical sensor 44. The processor 50 may determine and store the set point 164 which may be an image representative of the feature 162 of the material web 12 at a desired quality. The desired quality of the feature 162 may be represented as an image, one of the sequence of data frames 158, depicting the feature 162 at the desired quality. The desired quality of the feature 162 may be, for example, a color quality, dimensional quality, opacity, transparency, or any other quality aspect discernible from an image. The processor 50 may store the web quality inspection information indicative of the desired quality of the feature 162 of the material web 12 on the one or more non-transitory computer readable medium 52. The processor 50 may then determine a current quality of the feature 162 of the material web 12 using at least one of the data frames of the sequence of data frames 158 based on a comparison of the aspects of the desired quality of the feature 162 stored in the set point 164 relative to the current quality of the feature 162. The processor 50 may then determine the error signal 182 indicative of a difference between the desired quality and the current quality of the material web 12 and output the error signal 182, for instance to a user or other component of the web handling system 10.

Figure 13A:
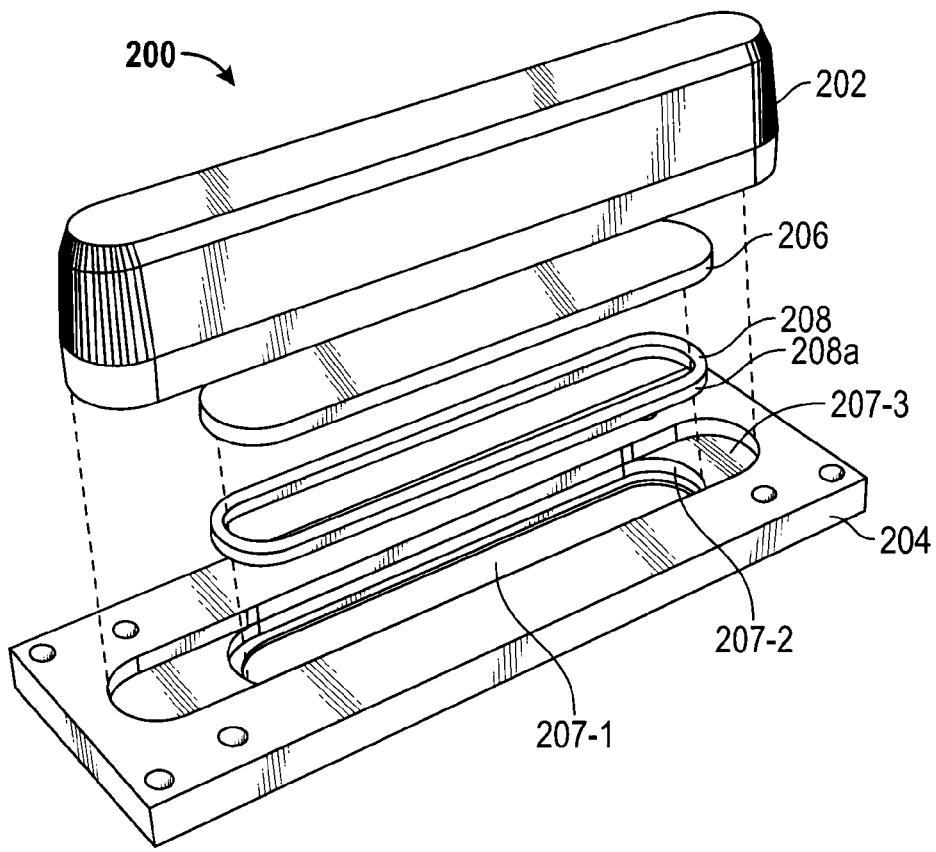
FIG. 13A depicts an exploded view of an exemplary enclosure for the natural interaction sensor of FIG. 1 according to the present disclosure.
Figure 13B:
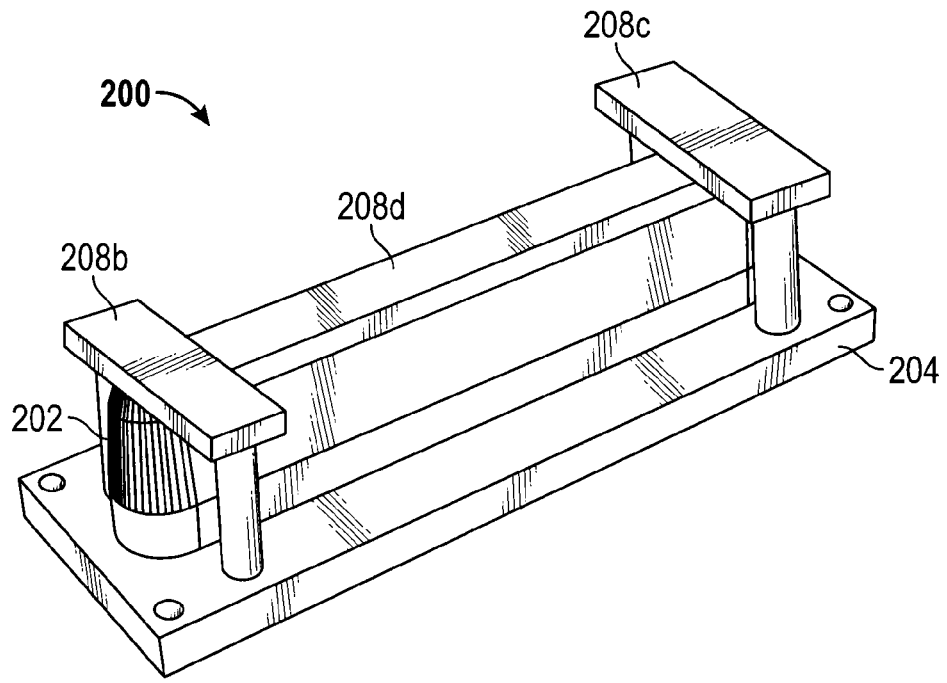
FIG. 13B shows a perspective view of a vibration dampener and the natural interaction sensor within the enclosure of FIG. 3A, in accordance with the present disclosure.

Referring now to FIGS. 13A and 13B, shown therein is the natural interaction sensor 40 disposed in a first enclosure 200 configured to receive and support the natural interaction sensor 40. The first enclosure 200 may be provided with a housing portion 202 partially surrounding a space configured to receive the natural interaction sensor 40, a face plate 204 configured to be secured to the housing portion 202 between the natural interaction sensor 40 and the material web 12, and a sensor window 206 configured to be secured to the face plate 204. The face plate 204 is provided with an opening 207-1 to permit the natural interaction sensor 40 to sense the material web 12 and the background 14 through the opening 207-1 and a first recess 207-2 surrounding the opening 207-1 to receive the sensor window 206 such that the sensor window 206 covers the opening 207-1 and the face plate 204 supports the sensor window 206. The sensor window 206, in one embodiment, may be transparent to visible and IR spectrum of light so that the natural interaction sensor 40 can sense the material web 12 and the background 14 through the sensor window 206. The face plate 204 may also be provided with a second recess 207-3 sized and shaped to matingly receive the housing portion 202.

In one embodiment, the first enclosure 200 may be provided with one or more vibration dampeners 208 configured to dampen vibrations within the first enclosure 200. The vibration dampeners 208 may be selected from a group comprising O-rings, rubber inserts, plastic inserts, and securing straps. In one embodiment, as shown in FIGS. 13A and 13B, a first vibration dampener 208a may be provided as an O-ring positioned between the face plate 204 and the sensor window 206. The first vibration dampener 208a may be configured to reduce or eliminate vibrations within the sensor window 206 to mitigate interference with the natural interaction sensor 40 generated by vibrations within the sensor window 206. Second and third vibration dampeners 208b and 208c, respectively, may be provided as securing straps configured to engage a rear surface 208d of the housing portion 202 to maintain the housing portion 202 within the second recess 207-3 of the face plate 204. The second and third vibration dampeners 208b and 208c may comprise plastic, hard rubber, springs, or similar materials which may provide vibration tolerance and reduce vibrations which may affect the natural interaction sensor 40. In one embodiment a single vibration dampener may be used in place of the second and third vibration dampeners 208a and 208c. It will be understood by one skilled in the art that greater or fewer vibration dampeners 208 may be used, so long as they provide sufficient support for the natural interaction sensor 40 and reduce vibrations such that the vibrations to not adversely affect the natural interaction sensor 40.

Figure 13C:
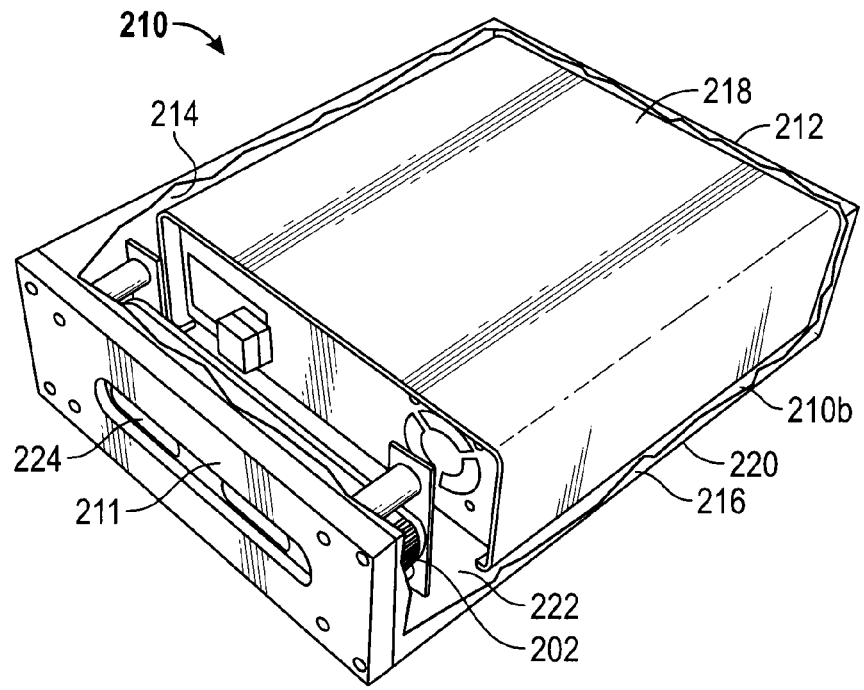
FIG. 13C is a perspective view an embodiment of the enclosure housing the natural interaction sensor and a sensor controller, in accordance with the present disclosure.
Figure 13D:
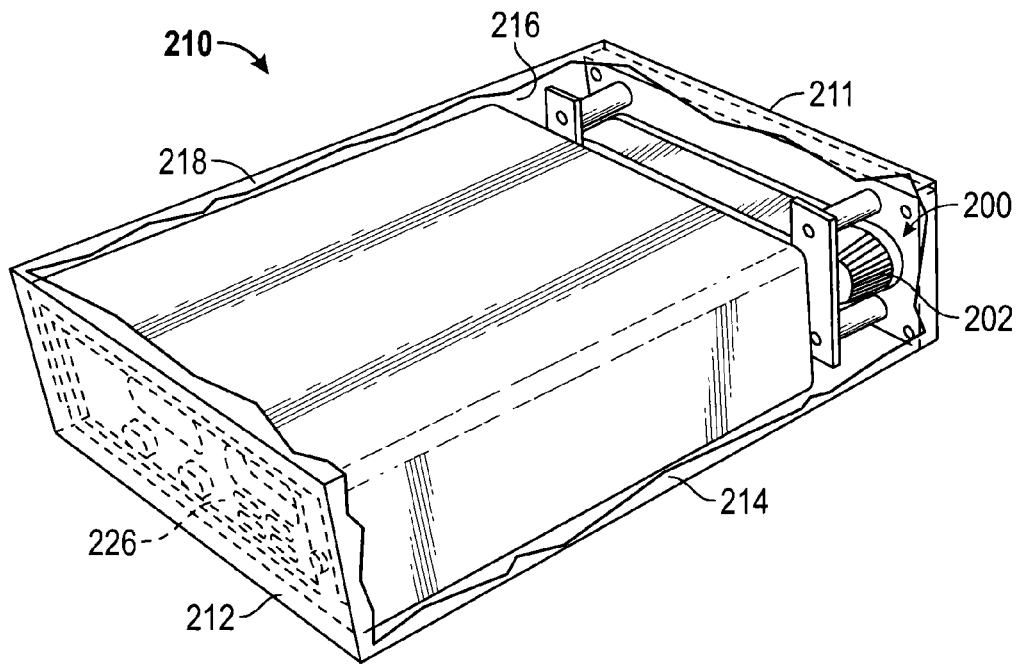
FIG. 13D is another perspective view of the enclosure of FIG. 13C.

As shown in FIGS. 13C and 13D, a second enclosure 210 may be configured to receive and support the first enclosure 200 containing the natural interaction sensor 40 and the sensor controller 22. The second enclosure 210 includes a front 211, a back 212, a first side 214 and a second side 216, a top 218 and a bottom 220. The front 211, the back 212, the first side 214 and the second side 216 partially or completely surround a space 222 receiving the first enclosure 200 and the sensor controller 22. An opening 224 is formed through the front 211 with the opening 224 aligned with the sensor window 206 to permit the natural interaction sensor 40 to sense the material web 12 and the background 14 through the opening sensor window 206 and the opening 224. The second enclosure 210 includes a connection panel 226 on the back 212 to provide communication connections/power to the sensor controller 22 and the natural interaction sensor 40. For example, the connection panel 226 will include the second port 58 to permit the sensor controller 22 to be connected to the web controller 24. The first and second enclosures 200 and 210 may be connected by screws, bolts, clamps, straps, or any other suitable mechanism. As one skilled in the art will understand, the second enclosure 210 is attached to a support mechanism (not shown) such that the front 211 faces the material web 12 and the background 14 such that the natural interaction sensor 40 can sense the material web 12 and the background 14.

Although a few embodiments of the present disclosure have been described in detail above, those of ordinary skill in the art will readily appreciate that many modifications are possible without materially departing from the teachings of the present disclosure. Accordingly, such modifications are intended to be included within the scope of the present disclosure as defined in the claims.

What is claimed is:

1. A sensor controller, comprising:
a first port configured to receive a sequence of data frames captured at distinct instants of time, the data frames capturing an area of a material web having a width to height ratio between 0.10 and 100;
one or more non-transitory computer readable medium storing logic indicative of information identifying properties of a first group of data points of a feature of the material web extending in a web direction of travel;
one or more processor analyzing the sequence of data frames having the first group of data points depicting the feature of the web, and a second group of data points depicting a background transverse to the feature, the one or more processor scanning the sequence of data frames to locate a transition between a first property of the first group of data points and one or more second property of the second group of data points in the data frames and to generate a series of location signals indicative of lateral locations of the transition within the data frames; and
a second port outputting the location signals.

2. The sensor controller of claim 1, wherein the feature is an edge of the web.

3. The sensor controller of claim 1, wherein the feature is a line extending longitudinally on a predominant surface of the web.

4. The sensor controller of claim 1, wherein the feature of the web is a first feature of the web and the transition is a first transition, and wherein the sequence of data frames has a third group of data points depicting a second feature of the web, and wherein the processor locates a second transition between the second group of data points and the third group of data points.

5. The sensor controller of claim 4, wherein the series of location signals is indicative of a difference in location of the first and second transitions relative to a set point.

6. The sensor controller of claim 4, wherein the one or more processor calculates a distance between the first transition and the second transition.

7. The sensor controller of claim 6, wherein the first and second features are opposing edges of the web.

8. The sensor controller of claim 1, wherein at least some of the sequence of data frames are depth maps in which the first group of data points are indicative of a first distance between a depth sensor and the feature of the web, and the second group of data points are indicative of a second distance between the depth sensor and the background, the second distance being greater than the first distance.

9. The sensor controller of claim 1, wherein the web is a first web, the feature is a first feature, the lateral location is a first lateral location, the background is a first background, the transition is a first transition, the web direction of travel is a first web direction of travel, and the location signal is a first location signal, and wherein the sequence of data frames has a third group of data points depicting at least one second feature extending in a second web direction of travel on a second web, and a fourth group of data points depicting a second background transverse to the second feature, the processor scanning the sequence of data frames to locate a second transition between the third group of data points and the fourth group of data points in the data frames and to generate a second location signal indicative of a second lateral location of the second transition.

10. A sensor controller, comprising:
a first port configured to receive a data stream having a sequence of data frames captured at distinct instants of time of a material web, the data frames capturing an area of the material web having a width to height ratio between 0.10 and 100;
one or more non-transitory computer readable medium storing first logic indicative of information identifying a first group of data points of a first feature extending in a web direction of travel of the material web, and second logic indicative of information identifying a second group of data points of a second feature extending in the web direction of travel of the material web;
one or more processor configured to analyze the data stream with the first group of data points of the first feature, a third group of data points depicting a background transverse to the first feature, and the second group of data points depicting the second feature, the second feature spaced a distance transversely from the first feature, the processor scanning the sequence of data frames to locate a first transition between the first group of data points and the third group of data points in the data frames, and a second transition between the second group of data points and the third group of data points in the data frames, and to generate web handling signals indicative of at least one of the locations of the first and second transitions and a lateral distance between the first and second transitions; and
a second port outputting the web handling signals.

11. The sensor controller of claim 10, wherein the web handling signal is indicative of a first operational aspect of the material web.

12. The sensor controller of claim 11, wherein the first operational aspect of the material web is tension.

13. The sensor controller of claim 11, wherein the first operational aspect of the web is a desired location of the web, and wherein the web handling signal includes an error signal indicative of a difference in relative locations between the first and second transitions and a set point.

14. A sensor controller, comprising:
a first port configured to receive a sequence of signals from a topographic sensor having a field of view encompassing a feature of a web, the sequence of signals including a series of depth maps;
one or more non-transitory computer readable medium storing web handling information indicative of a desired aspect of the feature of the web;
one or more processor configured to determine a current aspect of the feature of the web using at least one of the depth maps in the series of depth maps and to determine an error signal indicative of a difference between the current aspect and the web handling information stored on the one or more non-transitory computer readable medium; and
a second port outputting the error signal.

15. A sensor controller, comprising:
a first port configured to receive a sequence of signals from a topographic sensor having a field of view encompassing a feature of a web; the sequence of signals including a series of depth maps, the first port also being configured to receive a sequence of video frames of the feature of the web synchronized with the depth maps;
one or more non-transitory computer readable medium storing web handling information indicative of the feature of the web and desired quality inspection aspect of the web;
one or more processor configured to determine a current location of the feature of the web using at least one of the sequence of video frames and the depth maps, and to determine a current quality inspection aspect of the feature of the web using at least one of the sequence of video frames and depth; and a second port outputting the signals indicative of the current location of the feature of the web and the current quality inspection aspect of the web.

16. A web handling system, comprising:

a natural interaction sensor having one or more depth sensor supplying a sequence of data frames of a material web; and a sensor controller having a first port configured to receive data from the natural interaction sensor, one or more non-transitory computer readable medium coupled to the first port, one or more processor coupled to the one or more non-transitory computer readable medium and configured to analyze the data received from the natural interaction sensor, the one or more processor scanning the data to locate a transition in one or more data frames and to generate a series of location signals indicative of a lateral location of the transition within the data frames, and a second port coupled to the one or more processor and outputting the location signals.

17. The web handling system of claim 16, wherein the natural interaction sensor further comprises one or more audio sensors configured to provide a synchronization data stream.

18. The web handling system of claim 16 further comprising an enclosure having a housing portion configured to receive the natural interaction sensor, a face plate configured to be secured to the housing portion, and a sensor window configured to be secured to the face plate and transparent to a medium output by the one or more depth sensor.

19. The web handling system of claim 18, wherein the medium is selected from a group consisting of light, radio frequency emissions, and sound.

20. The web handling system of claim 18, wherein the enclosure further comprises one or more vibration dampeners configured to dampen vibrations within the enclosure.

21. The web handling system of claim 20, wherein the one or more vibration dampeners are selected from a group comprising O-rings, rubber inserts, plastic inserts, and securing straps.

22. The web handling system of claim 18 wherein the enclosure is a first enclosure and further comprising a second enclosure configured to receive the sensor controller and be connected to the first enclosure.

* * * * *